United States Patent
Ohnishi et al.

(10) Patent No.: US 8,717,578 B2
(45) Date of Patent: May 6, 2014

(54) PROFILOMETER, MEASURING APPARATUS, AND OBSERVING APPARATUS

(75) Inventors: Yasuhiro Ohnishi, Kyotanabe (JP); Masatoshi Kimachi, Katano (JP); Masaki Suwa, Kyoto (JP); Shree Nayar, New York, NY (US)

(73) Assignee: OMRON Corporation, Kyoto (JP)

( * ) Notice: Subject to any disclaimer, the term of this patent is extended or adjusted under 35 U.S.C. 154(b) by 211 days.

(21) Appl. No.: 13/263,665

(22) PCT Filed: Apr. 9, 2010

(86) PCT No.: PCT/US2010/030469
§ 371 (c)(1),
(2), (4) Date: Oct. 7, 2011

(87) PCT Pub. No.: WO2010/118281
PCT Pub. Date: Oct. 14, 2010

(65) Prior Publication Data
US 2012/0044504 A1  Feb. 23, 2012

Related U.S. Application Data

(63) Continuation-in-part of application No. 12/421,994, filed on Apr. 10, 2009, now abandoned.

(51) Int. Cl.
*G01B 11/30* (2006.01)
*G01B 11/24* (2006.01)

(52) U.S. Cl.
USPC .......... 356/602; 356/600; 356/601; 356/604; 356/611

(58) Field of Classification Search
USPC ............... 356/237.1–241.6, 242.1–243.8, 356/426–431, 600–640
See application file for complete search history.

(56) References Cited

U.S. PATENT DOCUMENTS

| | | | | |
|---|---|---|---|---|
| 3,667,832 A * | 6/1972 | Kitano et al. | ................. | 359/653 |
| 4,609,978 A * | 9/1986 | Hsieh et al. | .................. | 362/335 |
| 5,027,281 A * | 6/1991 | Rekow et al. | ................. | 700/182 |
| 6,157,444 A * | 12/2000 | Tomita et al. | ............... | 356/237.1 |
| 7,654,715 B1 * | 2/2010 | Chen et al. | .................... | 362/552 |
| 2009/0006044 A1 * | 1/2009 | Zhou et al. | ........................ | 703/2 |

FOREIGN PATENT DOCUMENTS

DE  199 44 354 A1  4/2001
EP  1 568 985 A2  8/2005

OTHER PUBLICATIONS

Office Action issued in corresponding German Application No. 11 2010 001 574.0 dated Jan. 24, 2013, and English language communication reporting the same (16 pages).

* cited by examiner

*Primary Examiner* — Gregory J Toatley
*Assistant Examiner* — Jarreas C Underwood
(74) *Attorney, Agent, or Firm* — Osha Liang LLP

(57) ABSTRACT

An observing apparatus includes a lighting device for irradiating a surface of a measuring target with light having a first light source distribution, and an imaging section for imaging the surface of the measuring target. Considering a first plane passing through a measurement point, the first light source distribution is set such that: (1) a radiance $L_{11}(\theta)$ changes in a continuous or stepwise manner according to an angle $\theta$, and (2) the radiance $L_{11}(\theta)$ is not zero in a local region of a predetermined range of $\pm\sigma$ having a point located at a predetermined angle $\theta c$ as a center on the first plane when viewed from the measurement point, and the following equation substantially holds for arbitrary a satisfying $0<a\leq\sigma$; $L_{11}(\theta_c-a)+L_{11}(\theta_c+a)=2\times L_{11}(\theta_c)$.

19 Claims, 19 Drawing Sheets

Principle of Stereo Measurement

Color Highlight Method
(View of Brief Overview of Device)

Color Highlight Method
(Principle View)

PROFILOMETER, MEASURING APPARATUS, AND OBSERVING APPARATUS

BACKGROUND OF THE INVENTION

1. Technical Field

The present invention relates to a technique of measuring the profile of a surface of a measuring target. The present invention also relates to a technique of measuring or observing the surface of the measuring target.

2. Related Art

A technique of using color information and a technique of using luminance information are conventionally known as a technique of measuring a normal profile of a measuring target.

A color highlight method is known as a technique of measuring the normal profile using the color information. As shown in FIGS. 20A and 20B, the color highlight method includes arranging red, blue, and green ring lightings in a dome, and irradiating the measuring target with each color. The direction of a normal line (only zenith angle component) of the surface to be measured is distinguished in three ways by analyzing the color of reflected light from the measuring target to calculate the surface profile. As a modification of the color highlight method, a technique (refer to, for example, Japanese Patent Application Laid-Open No. 3-142303) of finely measuring the normal line (only zenith angle component) of the surface to be measured by arranging great number of concentric lightings in a hood, and a technique (refer to, for example, Japanese Patent Publication No. 3553652) of performing photography using two types of lighting patterns of a zenith angle component measurement pattern and an azimuth angle component measurement pattern, and calculating the zenith angle component and the azimuth angle component of the normal line from the respective images are known.

An illuminance difference stereo method is known as a technique of measuring the normal profile to be measured using the luminance information. As shown in FIG. 21, the illuminance difference stereo method is a method of acquiring the normal direction at each point of the object surface based on a plurality of images photographed one at a time under three or more different light sources using shadow information of the object. More specifically, the luminance information is acquired using an object which profile is known, for example, from three images photographed under different light sources. The direction of the normal line is uniquely determined by a set of luminance values, and is saved as a table. In time of measurement, photography is performed under three light sources, and the normal line is obtained from a set of luminance information with reference to the created table. According to the illuminance difference stereo method, the normal line of an object, which does not have a perfect mirror surface, can be obtained.

SUMMARY

However, the following problems arise in the related art.

In the color highlight method using color features, an object which reflectance property is not uniform cannot be measured. Furthermore, the measurement accuracy lowers due to color mixture of the reflected light when an imperfect mirror surface (when including lobe) is used even if the reflectance property is uniform.

In the illuminance difference stereo method using the luminance information, the object which reflectance property is uniform can be measured other than the perfect mirror surface, but the accuracy in normal calculation lowers if the reflectance property is not uniform since the luminance value varies depending on the reflectance property. The accuracy in the normal calculation lowers even if the object has uniform reflectance property when the reflectance properties of the object (reference object) used in creating a table and the measuring target are different.

In view of the above situations, it is an object of the present invention to provide a technique capable of calculating, with satisfactory accuracy, the normal information (XYZ component of unit vector, or zenith angle component and azimuth angle component) even with respect to a measuring target in which the reflectance property is not uniform, or in which the reflectance property is uniform but the reflectance property itself differs from the reference object.

It is another object of the present invention to provide a technique capable of observing reflected light irrespective of unevenness of reflectance property (that is, a variation in degree of spread of lobe). It is still another object of the present invention to provide a technique capable of obtaining information on a light reflection angle of a surface of a measuring target even if the measuring target has an unknown reflectance.

In order to achieve the above aim, in the present invention, a lighting device having a distribution in which a radiance of a reflected light when a measuring target having arbitrary reflectance property is irradiated with light becomes the same as a radiance in the perfect mirror surface, that is, light source distribution in which the reflected light including a diffusion reflection coincides with the regular reflection light with respect to the measuring target of an arbitrary reflectance property is used. In other words, a lighting device that can handle the target similar to the perfect mirror surface when a measuring target is photographed under such lighting is used.

More specifically, a first aspect of the present invention relates to a profilometer for measuring a surface profile of a measuring target, the device including a lighting device for irradiating the measuring target with light, an imaging device for imaging a reflected light from the measuring target, and a normal calculation means for calculating a normal direction of a surface at each position of the measuring target from an imaged image, where the lighting device has the following features.

In order for the lighting device to have the above features, the lighting device merely needs to have a light source distribution in which a radiance of center of gravity of the light source distribution of a point symmetric region coincides with a radiance of the center of the point symmetric region in an arbitrary point symmetric region of the light emission region.

Assuming the light source distribution in the light emission region of the lighting device is $L_i(p, \theta, \phi)$, the radiance (camera luminance value) $L_r(p, \theta_r, \phi_r)$ can be generally expressed as below with the reflectance property of the object surface as $f(p, \theta_i, \phi_i, \theta_r, \phi_r)$.

$$L_r(p, \theta_r, \phi_r) = \iint_{\Omega} L_i(p, \theta_i, \phi_i) \cdot f(p, \theta_i, \phi_i, \theta_r, \phi_r) \cos\theta_i \sin\theta_i d\theta_i d\phi_i \quad (1)$$

Here, $\Omega$ is a solid angle of a hemispherical surface.

In particular, if the object surface is a perfect mirror surface, the radiance $L_r$, can be expressed as below.

$$L_r(p, \theta_r, \phi_r) = L_i(p, \theta_{is}, \phi_{is} + \pi) \quad (2)$$

Here, in an arbitrary region (range of light source distribution) $\Omega(\theta_{is}, \phi_{is})$ internally including $(\theta_{is}, \phi_{is})$, the object can be handled as a perfect mirror surface, even with respect to an object which target surface is an imperfect mirror surface, by using a light source distribution $L_i(p, \theta, \phi)$ that satisfies (1)=(2).

However, it is analytically difficult to obtain the light source distribution Li(p, θ, φ) that precisely satisfies (1)=(2). Thus, consider the light source distribution Li(p, θ, φ) in which (1)−(2) becomes a sufficiently small value. As the approximation solution, it is suitable to adopt a light source distribution that does not depend on a position p and a normal vector of the p, and that becomes constant with respect to the p and the normal vector of the p.

A specific example of an approximation solution satisfying the above condition includes a light source distribution in which the light source distribution linearly changes with respect to the longitude, assuming a sphere in which the measuring target is at the center and both poles are on a plane including the measuring target. Another example is a light source distribution in which the light source distribution linearly changes with respect to the latitude. Another further example is a light source distribution in which the light emission region has a planar shape, and which linearly changes on the plane thereof.

Such light source distribution is the approximation solution of (1)=(2), where even the object which target surface is an imperfect mirror surface can be handled as if the target is a perfect mirror surface by using such lighting device.

It is preferable to use the light source distribution that satisfies the above condition, and in which a plurality of light source distributions different from each other is overlapped. A normal line of a target in plurals and with different reflectance property thus can be uniquely calculated.

A second aspect of the present invention relates to a measuring apparatus for measuring a surface of a measuring target arranged at a predetermined measurement point, the measuring apparatus including: a lighting device for irradiating the surface of the measuring target with light having a first light source distribution and light having a second light source distribution; an imaging section for imaging the surface of the measuring target irradiated with the light by the lighting device; and a measurement processing section for obtaining information on an light reflection angle at the measurement point on the surface of the measuring target using an image imaged by the imaging section. In the measuring apparatus, the lighting device has a plurality of first specific regions each of which includes a plurality of light emission elements in a section of a first plane passing through the measurement point, the plurality of first specific regions are equal to each other in a length of an arc on the first plane when projected to a circle having a unit radius with the measurement point as a center, and the plurality of first specific regions differ from each other in a position of a light emission center when a point on the first specific region projected to the center of the arc is defined as the light emission center of the first specific region. In this case, when radiances in the first light source distribution and the second light source distribution in a direction toward the measurement point from the light emission element that is located at an angle when viewed from the measurement point are expressed as $L_{11}(\theta)$ and $L_{12}(\theta)$ on the first plane, the first light source distribution and the second light source distribution are set such that:

(a) when the first specific region has a spread of ±σ having an angle $\theta_C$ with the light emission center as the center on the first plane, the radiances $L_{11}(\theta)$ and $L_{12}(\theta)$ are not zero in any of the first specific regions, and the following equations substantially hold for arbitrary a satisfying 0<a≤σ;

$$L_{11}(\theta_C-a)+L_{11}(\theta_C+a)=2\times L_{11}(\theta_C)$$

$$L_{12}(\theta_C-a)+L_{12}(\theta_C+a)=2\times L_{12}(\theta_C), \text{ and}$$

(b) a ratio $L_{11}(\theta_C)/L_{12}(\theta_C)$ of the radiances of the light emission center varies in each of the first specific regions.

The influence of the lobe derived from the light emitted from a region ($\theta_C-\sigma \leq \theta < \theta_C$) having an angle smaller than that of the light emission center ($\theta_C$) and the influence of the lobe from the light emitted from a region ($\theta_C < \theta \leq \theta_C+\sigma$) having an angle larger than that of the light emission center cancel each other using the light source distribution satisfying the condition (a). Therefore, the reflected light can be observed similarly to the perfect mirror surface irrespective of the degree of the spread of the lobe in the surface of the measuring target.

When the two light source distributions satisfy the condition (b), the direction of the light source (specific region) emitting the light can uniquely be specified in the first plane by evaluating the feature value expressing the intensity ratio of the pieces of reflected light observed in the two light source distributions, and therefore the information on the light reflection direction of the surface of the measuring target can be obtained. The intensity of the reflected light depends on a reflectance of the surface of the measuring target. However, because the reflectance can be eliminated by computing the intensity ratio of the pieces of reflected light, the information on the light reflection direction can be computed even if the measuring target has the unknown reflectance. The "reflectance" means a ratio of intensity of a reflected light beam to intensity of an incident light beam for the light beam.

In the measuring apparatus according to the second aspect, preferably the lighting device can further irradiate the surface of the measuring target with light having a third light source distribution. In this case, the lighting device has a plurality of second specific regions each of which includes a plurality of light emission elements in a section of a second plane passing through the measurement point, the second plane being different from the first plane, the plurality of second specific regions are equal to each other in a length of an arc on the second plane when projected to the circle having the unit radius with the measurement point as the center, and the plurality of second specific regions differ from each other in the position of the light emission center when a point on the second specific region projected to the center of the arc is defined as the light emission center of the second specific region. When radiances in the first light source distribution and the third light source distribution in a direction toward the measurement point from the light emission element that is located at an angle φ when viewed from the measurement point are expressed as $L_{21}(\phi)$ and $L_{23}(\phi)$ on the second plane, the first light source distribution and the third light source distribution are set such that:

(a) when the second specific region has a spread of ±σ having an angle $\theta_C$ with the light emission center as the center on the second plane, the radiances $L_{21}(\phi)$ and $L_{23}(\phi)$ are not zero in any of the second specific regions, and the following equations substantially hold for arbitrary a satisfying 0<a≤σ;

$$L_{21}(\phi_C-a)+L_{21}(\phi_C+a)=2\times L_{21}(\phi_C)$$

$$L_{23}(\phi_C-a)+L_{23}(\phi_C+a)=2\times L_{23}(\phi_C), \text{ and}$$

(b) a ratio $L_{21}(\phi_C)/L_{23}(\phi_C)$ of the radiances of the light emission center varies in each of the second specific regions.

Therefore, also for the second plane, the reflected light can also be observed similarly to the perfect mirror surface irrespective of the degree of the spread of the lobe in the surface of the measuring target, and therefore the information on the light reflection direction of the surface of the measuring target can be obtained for two degrees of freedom.

A third aspect of the present invention relates to a measuring apparatus for measuring a surface of a measuring target arranged at a predetermined measurement point, the measuring apparatus including: a lighting device for irradiating the surface of the measuring target with light having a first light source distribution and light having a second light source distribution; an imaging section for imaging the surface of the measuring target irradiated with the light by the lighting device; and a measurement processing section for obtaining information on an light reflection angle at the measurement point on the surface of the measuring target using an image imaged by the imaging section. In the measuring apparatus, the lighting device has a light emission region having a predetermined extent. When radiances in the first light source distribution and the second light source distribution in a direction toward the measurement point from a point that has an angle $\theta$ on the light emission region when viewed from the measurement point are expressed as $L_{11}(\theta)$ and $L_{12}(\theta)$ on a first plane passing through the measurement point, the first light source distribution and the second light source distribution are set with respect to a plurality of points i on the light emission region such that:

(1) at least one of the radiances $L_{11}(\theta)$ and $L_{12}(\theta)$ increases or decreases in a continuous or stepwise manner according to the angle $\theta$, (2) in a local region of a predetermined range of $\pm\sigma$ having an angle $\theta_i$ with the point i as the center, the radiances $L_{11}(\theta)$ and $L_{12}(\theta)$ are not zero, and the following equations substantially hold for arbitrary a satisfying $0<a\leq\sigma$;

$$L_{11}(\theta_i-a)+L_{11}(\theta_i+a)=2\times L_{11}(\theta_i)$$

$$L_{12}(\theta_i-a)+L_{12}(\theta_i+a)=2\times L_{12}(\theta_i), \text{ and}$$

(3) a ratio $L_{11}(\theta_i)/L_{12}(\theta_i)$ of the radiances at the point i varies in each of the angles $\theta_i$.

In the local region centering on each point i, the influence of the lobe derived from the light emitted from a region $(\theta_i-\sigma\leq\theta<\theta_i)$ having an angle smaller than that of the light emission center $(\theta_i)$ and the influence of the lobe from the light emitted from a region $(\theta_i<\theta\leq\theta_i+\sigma)$ having an angle larger than that of the light emission center cancel each other using the light source distribution satisfying the condition (2). Therefore, the reflected light can be observed similarly to the perfect mirror surface irrespective of the degree of the spread of the lobe in the surface of the measuring target. The direction of the light source (point i on the light emission region) emitting the light can uniquely be specified in the first plane by evaluating the intensity ratio of the pieces of reflected light observed in the two light source distributions on the condition (3), and therefore the information on the light reflection direction of the surface of the measuring target can be obtained. The intensity of the reflected light depends on a reflectance property (reflectance) of the surface of the measuring target. However, because the reflectance can be eliminated by computing the intensity ratio of the pieces of reflected light, the information on the light reflection direction can be computed even if the measuring target has the unknown reflectance.

In the measuring apparatus according to the third aspect, preferably the lighting device can further irradiate the surface of the measuring target with light having a third light source distribution. In this case, when radiances in the first light source distribution and the third light source distribution in a direction toward the measurement point from a point that has an angle $\phi$ on the light emission region when viewed from the measurement point are expressed as $L_{21}(\phi)$ and $L_{23}(\phi)$ on a second plane passing through the measurement point, the second plane being different from the first plane, the first light source distribution and the third light source distribution are set with respect to a plurality of points j on the light emission region such that:

(1) the radiances $L_{23}(\phi)$ increases or decreases in a continuous or stepwise manner according to the angle $\theta$, (2) in a local region of a predetermined range of $\pm\sigma$ having an angle $\phi_j$ with the point j as the center, the radiances $L_{21}(\phi)$ and $L_{23}(\phi)$ are not zero, and the following equations substantially hold for arbitrary a satisfying $0<a\leq\sigma$;

$$L_{21}(\phi_j-a)+L_{21}(\phi_j+a)=2\times L_{21}(\phi_j)$$

$$L_{23}(\phi_j-a)+L_{23}(\phi_j+a)=2\times L_{23}(\phi_j), \text{ and}$$

(3) a ratio $L_{21}(\phi_j)/L_{23}(\phi_j)$ of the radiances at the point j varies in each of the angles $\phi_j$.

Therefore, also for the second plane, the reflected light can also be observed similarly to the perfect mirror surface irrespective of the degree of the spread of the lobe in the surface of the measuring target, and therefore the information on the light reflection direction of the surface of the measuring target can be obtained for two degrees of freedom.

For example, a light source distribution in which each of the radiances $L_{11}(\theta)$ and $L_{12}(\theta)$ is a linear function of the angle $\theta$ and a light source distribution in which the radiances $L_{21}(\phi)$ and $L_{23}(\phi)$ are a linear function of the angle $\phi$ can preferably adopted as the light source distribution satisfying the condition (2). The adoption of the simple light source distribution facilitates the design and manufacturing of the lighting device.

A fourth aspect of the present invention relates to an observing apparatus for observing reflected light from a surface of a measuring target arranged at a predetermined measurement point, the observing apparatus including: a lighting device for irradiating the surface of the measuring target with light having a first light source distribution; and an imaging section for imaging the surface of the measuring target irradiated with the light by the lighting device. In the observing apparatus, the lighting device has a plurality of first specific regions each of which includes a plurality of light emission elements in a section of a first plane passing through the measurement point, the plurality of first specific regions are equal to each other in a length of an arc on the first plane when projected to a circle having a unit radius with the measurement point as a center, and the plurality of first specific regions differ from each other in a position of a light emission center when a point on the first specific region projected to the center of the arc is defined as the light emission center of the first specific region. When a radiance in the first light source distribution in a direction toward the measurement point from the light emission element that is located at an angle $\theta$ when viewed from the measurement point is expressed as $L_{11}(\theta)$ on the first plane, the first light source distribution is set such that:

(a) when the first specific region has a spread of $\pm\sigma$ having an angle $\theta_C$ with the light emission center as the center on the first plane, the radiance $L_{11}(\theta)$ is not zero in any of the first specific regions, and the following equation substantially holds for arbitrary a satisfying $0<a\leq\sigma$;

$$L_{11}(\theta_C-a)+L_{11}(\theta_C+a)=2\times L_{11}(\theta_C), \text{ and}$$

(b) the value $L_{11}(\theta_C)$ of the radiance of the light emission center varies in each of the first specific regions.

The influence of the lobe derived from the light emitted from a region $(\theta_C-\sigma\leq\theta<\theta_C)$ having an angle smaller than that of the light emission center $(\theta_C)$ and the influence of the lobe from the light emitted from a region $(\theta_C<\theta\leq\theta_C+\sigma)$ having an angle larger than that of the light emission center cancel each other using the light source distribution satisfying the condition (a). Therefore, the reflected light can be observed similarly to the perfect mirror surface irrespective of the degree of the spread of the lobe in the surface of the measuring target. The surfaces having different gradients can be observed with different luminances (intensity of reflected light) on the condition (b). The image obtained with the imaging section is stored in a storage section, displayed on a display section, outputted to an external device, or used to calculate the information on the light reflection direction.

In the observing apparatus according to the fourth aspect, preferably the lighting device can further irradiate the surface of the measuring target with light having a second light source distribution. When a radiance in the second light source distribution in a direction toward the measurement point from the light emission element that is located at the angle θ when viewed from the measurement point are expressed as $L_{12}(\theta)$ on the first plane, the second light source distribution is set such that:

(a) when the first specific region has a spread of ±σ having the angle $\theta_C$ with the light emission center as the center on the first plane, the radiance $L_{12}(\theta)$ is not zero in any of the first specific regions, and the following equation substantially holds for arbitrary a satisfying 0<a≤σ;

$$L_{12}(\theta_C-a)+L_{12}(\theta_C+a)=2\times L_{12}(\theta_C), \text{ and}$$

(b) a ratio $L_{11}(\theta_C)/L_{12}(\theta_C)$ of the radiances of the light emission center varies in each of the first specific regions.

Therefore, the observation and evaluation can be performed irrespective of the reflectance of the surface of the measuring target by calculating the intensity ratio of the pieces of reflected light observed in the two light source distributions.

In the observing apparatus according to the fourth aspect, preferably the lighting device can further irradiate the surface of the measuring target with light having a third light source distribution. In this case, the lighting device has a plurality of second specific regions each of which includes a plurality of light emission elements in a section of a second plane passing through the measurement point, the second plane being different from the first plane, the plurality of second specific regions are equal to each other in a length of an arc on the second plane when projected to the circle having the unit radius with the measurement point as the center, and the plurality of second specific regions differ from each other in the position of the light emission center when a point on the second specific region projected to the center of the arc is defined as the light emission center of the second specific region. When radiances in the first light source distribution and the third light source distribution in a direction toward the measurement point from the light emission element that is located at an angle when viewed from the measurement point are expressed as $L_{21}(\phi)$ and $L_{23}(\phi)$ on the second plane, the first light source distribution and the third light source distribution are set such that:

(a) when the second specific region has a spread of ±σ having an angle $\phi_C$ with the light emission center as the center on the first plane, the radiances $L_{21}(\phi)$ and $L_{23}(\phi)$ are not zero in any of the second specific regions, and the following equations substantially hold for arbitrary a satisfying 0<a≤σ;

$$L_{21}(\phi_C-a)+L_{21}(\phi_C+a)=2\times L_{21}(\phi_C)$$

$$L_{23}(\phi_C-a)+L_{23}(\phi_C+a)=2\times L_{23}(\phi_C), \text{ and}$$

(b) a ratio $L_{21}(\phi_C)/L_{23}(\phi_C)$ of the radiances of the light emission center varies in each of the second specific regions.

Therefore, a gradient of the surface of the measuring target can be observed and evaluated for two degrees of freedom.

A fifth aspect of the present invention relates to an observing apparatus for observing reflected light from a surface of a measuring target arranged at a predetermined measurement point, the observing apparatus including: a lighting device for irradiating the surface of the measuring target with light having a first light source distribution; and an imaging section for imaging the surface of the measuring target irradiated with the light by the lighting device. In the observing apparatus, the lighting device has a light emission region having a predetermined extent. When a radiance in the first light source distribution in a direction toward the measurement point from a point that has an angle θ on the light emission region when viewed from the measurement point is expressed as $L_{11}(\theta)$ on a first plane passing through the measurement point, the first light source distribution is set such that:

(1) the radiance $L_{11}(\theta)$ changes in a continuous or stepwise manner according to the angle θ, and (2) in a local region of a predetermined range of ±σ centering on a point that is located at a predetermined angle $\theta_C$ when viewed from the measurement point on the first plane, the radiance $L_{11}(\theta)$ is not zero, and the following equation substantially holds for arbitrary a satisfying 0<a≤σ;

$$L_{11}(\theta_C+a)+L_{11}(\theta_C+a)=2\times L_{11}(\theta_C).$$

The influence of the lobe derived from the light emitted from a region ($\theta_C-\sigma \leq \theta < \theta_C$) having an angle smaller than that of the light emission center ($\theta_C$) and the influence of the lobe from the light emitted from a region ($\theta_C<\theta\leq\theta_C+\sigma$) having an angle larger than that of the light emission center cancel each other using the light source distribution satisfying the condition (2). Therefore, the reflected light of the light emitted from a point located at the angle $\theta_C$ can be observed similarly to the perfect mirror surface irrespective of the degree of the spread of the lobe in the surface of the measuring target. The image obtained with the imaging section is stored in the storage section, displayed on the display section, outputted to an external device, or used to calculate the information on the light reflection direction.

In the observing apparatus according to the fifth aspect, preferably the lighting device can further irradiate the surface of the measuring target with light having a second light source distribution, the second light source distribution being different from the first light source distribution. In this case, when a radiance in the second light source distribution in a direction toward the measurement point from a point that has an angle θ on the light emission region when viewed from the measurement point is expressed as $L_{12}(\theta)$ on the first plane, the second light source distribution is preferably set such that the radiances $L_{12}(\theta)$ is not zero in the local region and the following equation substantially holds for arbitrary a satisfying 0<a≤σ;

$$L_{12}(\theta_C-a)+L_{12}(\theta_C+a)=2\times L_{12}(\theta_C).$$

Therefore, the observation and evaluation can be performed irrespective of the reflectance of the surface of the measuring target by calculating the intensity ratio of the pieces of reflected light observed in the two light source distributions.

In the present invention, when two kinds of light source distributions are used, preferably the lighting device simultaneously irradiates the surface of the measuring target with the light having the first light source distribution and the light having the second light source distribution, the light having the first light source distribution differing from the light having the second light source distribution in a wavelength, and the imaging section separates received reflected light into the pieces of light having the wavelengths and detects intensity of each of the pieces of reflected light of the light having the first light source distribution and the light having the second light source distribution. When three kinds of light source distributions are used, preferably the lighting device simultaneously irradiates the surface of the measuring target with the light having the first light source distribution, the light having the second light source distribution, and the light having the third light source distribution, the light having the first light source distribution, the light having the second light source distribution, the light having the third light source distribution differ from one another in a wavelength, and the imaging section separates received reflected light into the pieces of light having the wavelengths and detects intensity of each of the pieces of reflected light of the light having the first light source distribution, the light having the second light source distribution, and the light having the third light source distribution.

Therefore, the degrees of intensity of the pieces of reflected light in the two or three kinds of light source distributions can simultaneously be obtained only by one-time light irradiation and one-time imaging, so that a processing time can be shortened.

In the present invention, the "first plane" and the "second plane" can arbitrarily be set according to the direction of the angle to be measured, and the "first plane" and the "second plane" may be a plane perpendicular to the stage on which the measuring target is placed or a plane parallel to the stage.

The "radiance" means the number of photons per unit time in a micro region in a specific direction. Accordingly, when the light emitted from the light emission element has the spread, the "radiance in the direction toward the measurement point from the light emission element" means part (only the light reaching the micro region on the measurement point) of the light emitted from the light emission element. When the light emitted from the light emission element has the spread, preferably the radiance of the light emission element is line-symmetrically distributed in relation to the straight line passing the light emission element and measurement point on the first plane.

The arrangements and the number of "plurality of first specific regions" are arbitrary, the two first specific regions adjacent to each other may be separated, be in contact with each other, or overlap each other. The "plurality of second specific regions" are arranged in the similar manner. The lighting device may include a portion (light source) that emits the light in a region except the specific region. Preferably the size of the specific region, that is, the value of σ is set to the maximum value of the expected spread of the lobe or more. The spread of the lobe depends on the kind of the measuring target.

The radiances of the plurality of light emission regions included in one specific region may arbitrarily be distributed in the specific region as long as the condition (a) is satisfied. For example, in one specific region, the radiance may change continuously, the radiance may change in a stepwise manner, or the radiance may be kept constant.

In the condition (a), "substantially hold" means that the influence of the lobe needs not to be completely canceled. For example, even if a difference in intensity of the observed reflected light exists between the minimum spread of the lobe and the maximum spread of the lobe, the direction of the light source (specific region) can be specified when the difference is sufficiently smaller than a difference in intensity of the reflected light between the light sources (specific regions).

Examples of the "information on the light reflection angle at the measurement point on the surface of the measuring target" include the direction of the light source (specific region) that emits the light observed with the imaging section, the gradient at the measurement point on the surface of the measuring target, and the normal direction at the measurement point on the surface of the measuring target.

The present invention can be considered as a profilometer, a measuring apparatus, an observing apparatus, or an imaging system including at least some of the above-described means. The present invention can also be considered as a surface profile measurement method, a measuring method, an observing method, or an imaging method including at least some of the above-described processes, or a program for realizing such a method. The above-described means and processes can be respectively combined to each other as much as possible to configure the present invention.

According to the present invention, the normal information (XYZ component of unit vector, or zenith angle component and azimuth angle component) can be calculated with satisfactory accuracy even on a measuring target in which the reflectance property is not uniform, or in which the reflectance property is uniform but which reflectance property itself differs from the reference object.

According to the present invention, the reflected light can be observed irrespective of the unevenness of the reflectance property (that is, the variation in degree of the spread of the lobe). Furthermore, the information on the light reflection angle of the surface of the measuring target can be obtained even if the measuring target has an unknown reflectance.

BRIEF DESCRIPTION OF THE DRAWINGS

FIG. 5A is a perspective view and FIG. 5B is a side view;

FIG. 20A shows a view of a brief overview of the device and FIG. 20B shows a view showing a measurement principle;

DETAILED DESCRIPTION

Preferred embodiments of the invention will now be illustratively described in detail with reference to the drawings.

(First Embodiment)

<Brief Overview>

Figure 18:
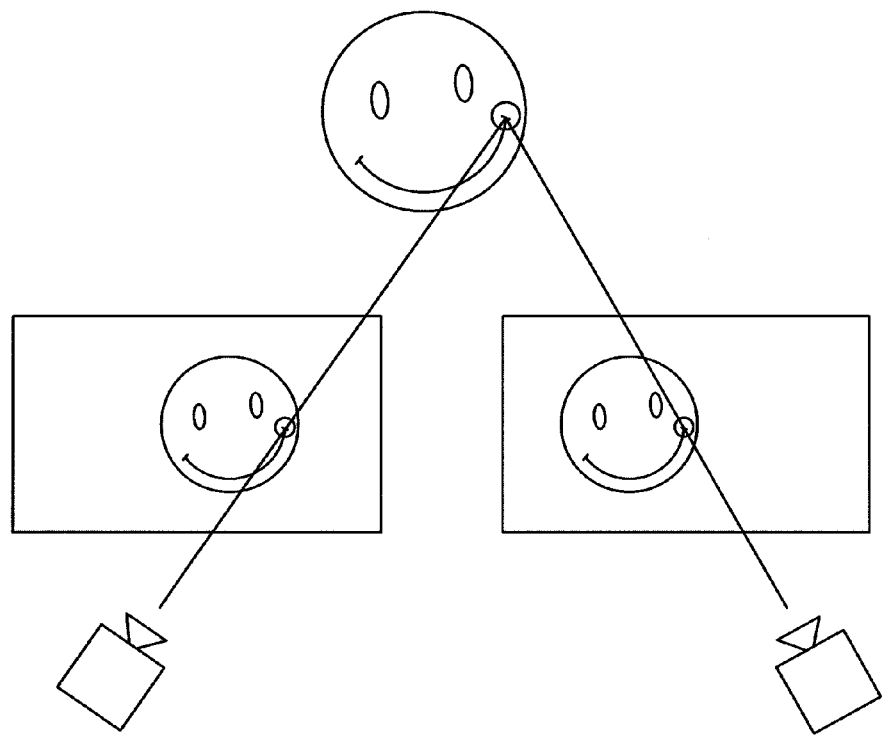
FIG. 18 shows a view showing the principle of a three-dimensional measurement.

A profilometer (normal measurement device) according to a first embodiment is used as one part of a three-dimensional measurement device for performing a three-dimensional measurement of a mirror surface object. As shown in FIG. 18, the three-dimensional measurement (triangulation) is a technique of examining the correspondence relationship of pixels from images photographed with a plurality of cameras of different imaging angle, and calculating a parallax to measure the distance. Normally, the corresponding pixel is examined by calculating the similarity with the luminance value as a feature quantity when examining the corresponding pixel.

Figure 19:
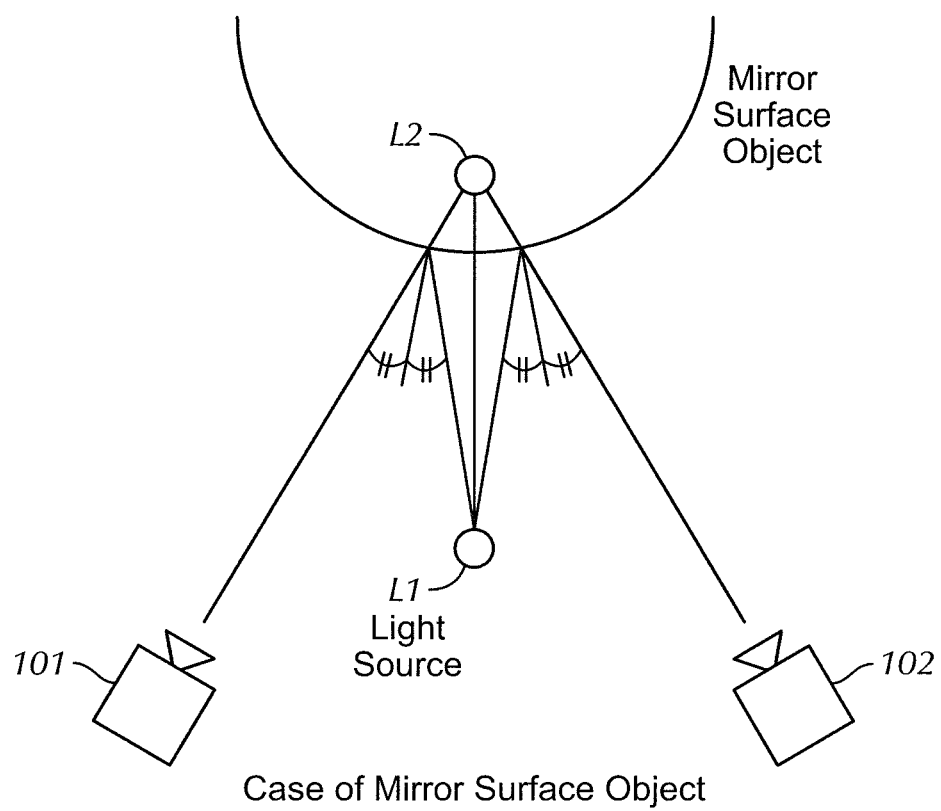
FIG. 19 shows a view describing a case of performing the three-dimensional measurement on a mirror surface object.
Figure 20A:
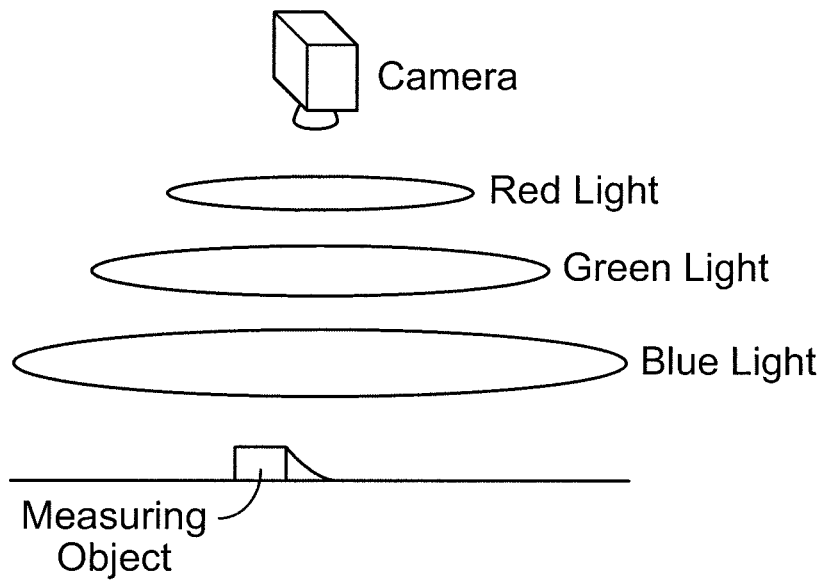
FIGS. 20A and 20B show views describing a surface profile measurement by a color highlight method, where
Figure 20B:
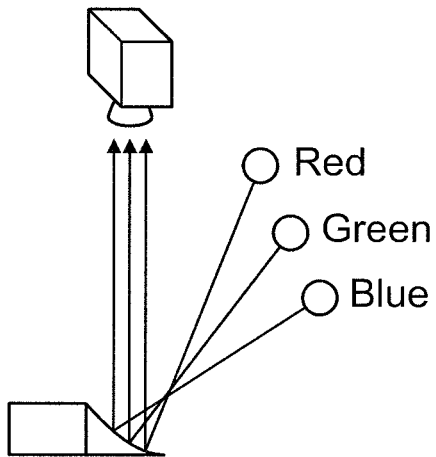
Figure 21:
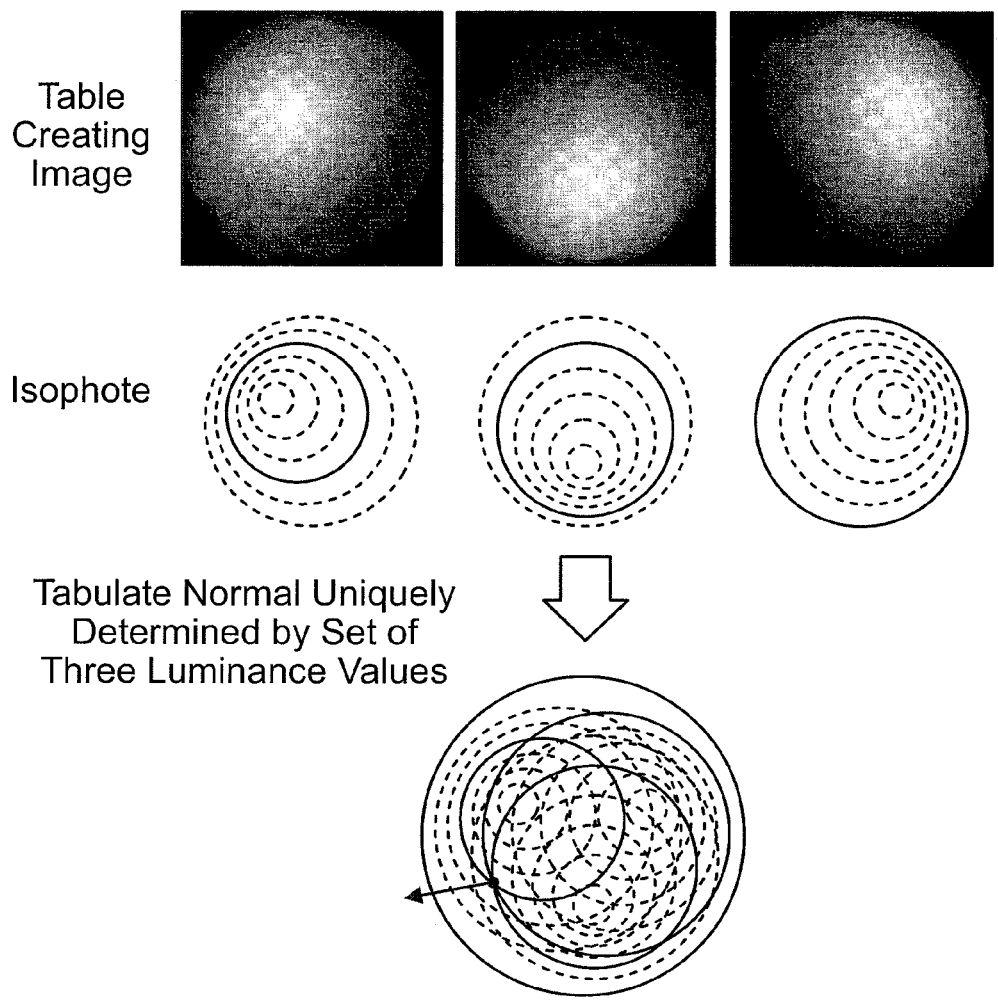
FIG. 21 shows a view describing a surface profile measurement by an illuminance difference highlight method.

If the measuring target is a mirror surface object, the luminance value photographed in the image does not represent the feature quantity of the object surface itself, but is determined by the reflection of the surrounding object. Therefore, when the mirror surface object is photographed with two cameras, as shown in FIG. 19, the position of the object surface where the emitted light from a light source L1 reflects differs. In performing the three-dimensional measurement using such points as the corresponding pixel, the location of point L2 in the figure is actually measured, and the error occurs. The larger the difference in the imaging angles of the cameras, the larger error.

The cause of such error is that the luminance information reflecting on the surface of the mirror surface object is not the feature of the surface itself of the mirror surface object. That is, in order to correctly perform the three-dimensional measurement, the correspondence of the pixel between the imaged images needs to be examined focusing on the feature of the surface of the mirror surface object. The direction of the normal line can be used for the feature of the surface of the mirror surface object. Thus, in the three-dimensional measurement device according to the present embodiment, the three-dimensional measurement is performed focusing on the direction of the normal line of the object surface.

Figure 1:
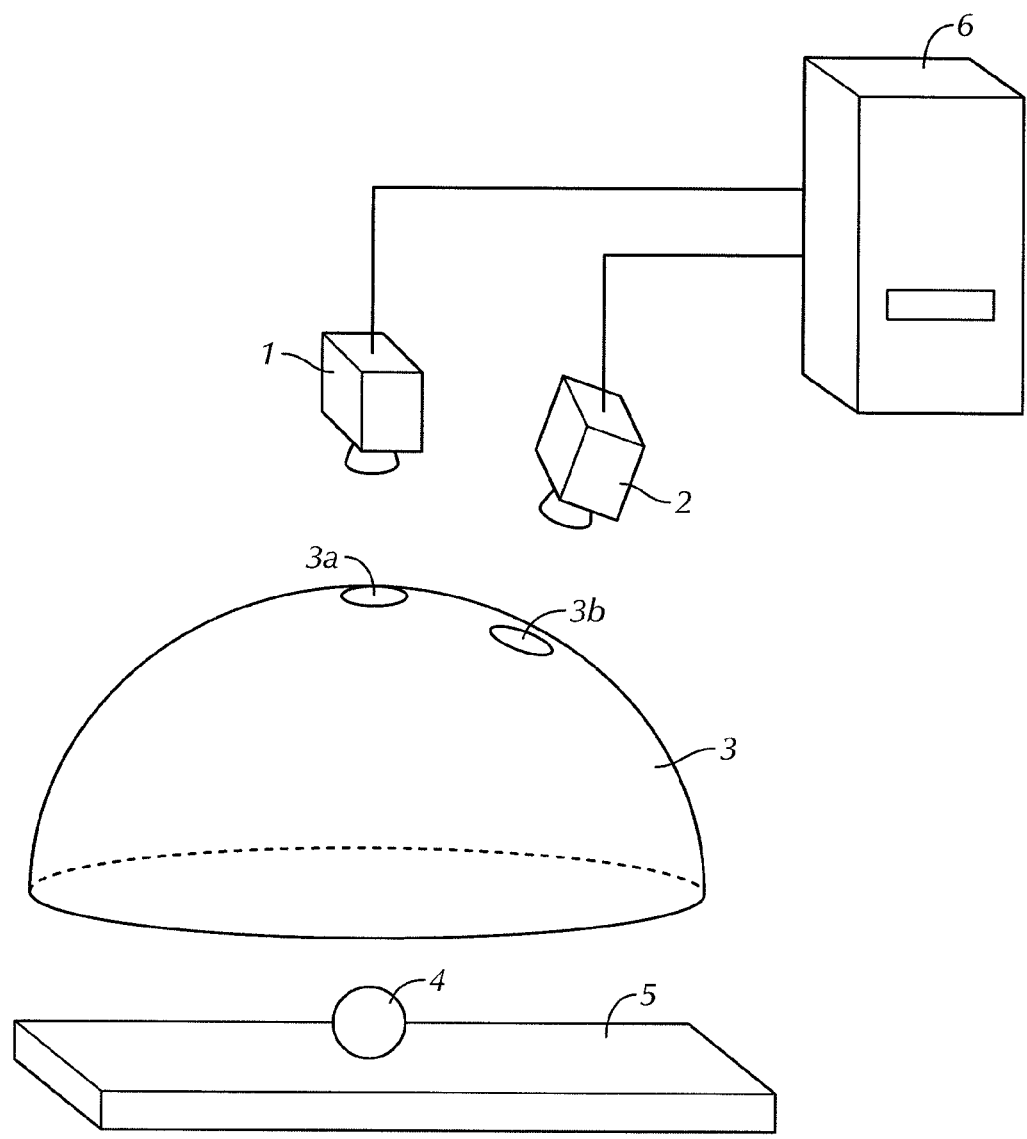
FIG. 1 shows a view showing a brief overview of a three-dimensional measurement device in a first embodiment.
Figure 2:
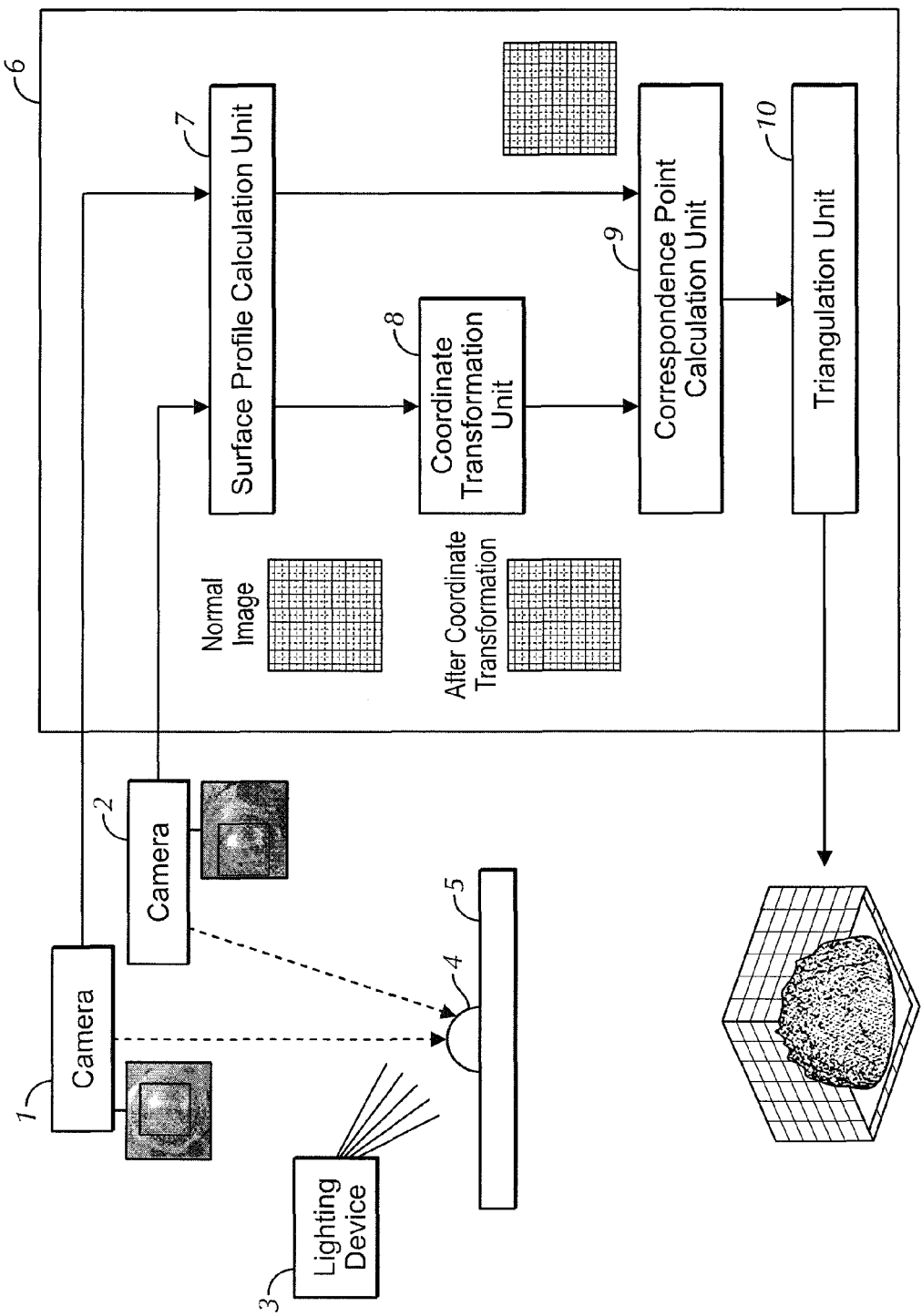
FIG. 2 shows a view showing function blocks of the three-dimensional measurement device in the first embodiment.

FIG. 1 shows a view showing a brief overview of the three-dimensional measurement device according to the present embodiment. FIG. 2 shows a view showing function blocks of the three-dimensional measurement device according to the present embodiment. As shown in FIG. 1, a measuring target 4 arranged on a stage 5 is photographed by two cameras 1, 2. Here, the camera 1 takes pictures from a vertical direction, and the camera 2 takes pictures from a direction shifted by about 40 degrees from the vertical direction. The measuring target 4 is irradiated with light from a dome-shaped lighting device 3, and the cameras 1, 2 photograph the reflected light of the light from the lighting device 3. The photographed image is retrieved into a computer 6, then image processed, and three-dimensional measurement is performed.

The computer 6 functions as a surface profile calculation unit 7, a coordinate transformation unit 8, a correspondence point calculation unit 9, and a triangulation unit 10, as shown in FIG. 2, by causing a CPU to execute a program. Each function unit may be partially or entirely realized by a dedicated hardware.

The images photographed by the cameras 1, 2 are respectively input to the surface profile calculation unit 7. The surface profile calculation unit 7 calculates the direction of the normal line at each position of the photographed measuring target 4. The details of the calculation process of the normal direction will be hereinafter described in detail.

The coordinate transformation unit 8 performs a coordinate transformation process of aligning the direction of the normal line calculated from the image photographed by the camera 2 to the coordinate system of the camera 1. The positional relationship of the cameras 1, 2 is adjusted in calibration performed prior to the measurement. A transformation matrix for transforming from the coordinate system of the camera 2 to the coordinate system of the camera 1 is obtained from the parameters acquired in the calibration.

The correspondence point calculation unit 9 calculates the corresponding pixel from two normal images, which coordinate systems are unified. This process is performed by obtaining the normal line of the same direction as the normal line at the focusing pixel in the normal image of the camera 1 from the normal image of the camera 2. In this case, the corresponding pixel exists on an epipolar line, and thus the relevant line merely needs to be searched. When searching for the pixel having the normal line of the same direction, the pixel having the highest similarity is searched using not only the information on only one focusing pixel but also information on the surrounding pixels thereof. The similarity can be obtained using a 7-pixel by 7-pixel window having the focusing pixel as a center with the position at where the direction of the normal lines matches the most as the correspondence pixel.

After the correspondence point in two images is obtained in the above manner, the depth information (distance) is calculated for each position of the measuring target 4 by the triangulation unit 10. This process is a known technique, and thus detailed description will be omitted.

<Surface Profile Measurement>

A process of calculating the surface profile (normal) of the measuring target 4 will now be described in detail.

[Lighting Device]

First, a configuration of a device for measuring the surface profile will be described. As shown in FIG. 1, for surface profile measurement, the measuring target 4 is lighted with a light radiated from the dome-shaped lighting device 3, and the reflected light thereof is photographed with the cameras 1, 2. The photographed image is image processed by the computer 6 to measure the surface profile. The lighting device 3 is formed with two holes 3a, 3b to photograph the cameras 1, 2.

Figure 3:
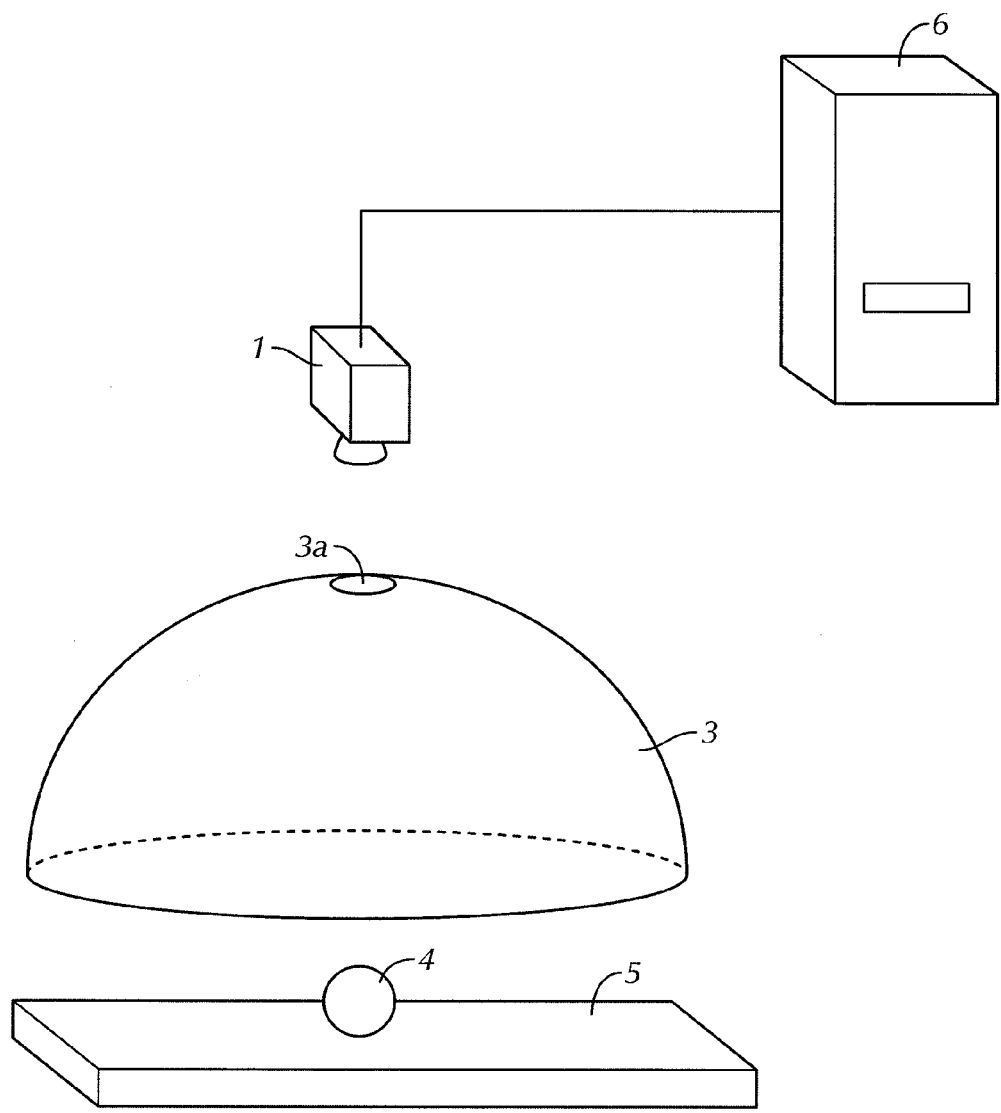
FIG. 3 shows a view showing another example of a profilometer.

In the present embodiment, a configuration of using two cameras is adopted since the surface profile is measured for three-dimensional measurement, but only one camera may be arranged as shown in FIG. 3 if the purpose is to simply measure the surface profile without performing the three-dimensional measurement. In this case, the measurement of the surface profile can be performed by performing an integral process on the normal image of the camera 1 or the camera 2.

The lighting device 3 has a dome-shape as shown in the figure, and the entire dome shape is the light emission region. Such lighting device 3 can be configured by, for example, a dome-shaped color filter and a light source for radiating white light from the exterior thereof. Furthermore, a configuration in which a plurality of LED chips is arrayed on the inner side of the dome to radiate light through a diffusion plate may be adopted. A liquid crystal display, an organic EL display, and the like may be formed to a dome shape to configure the lighting device 3.

The profile of the light emission region of the lighting device 3 is preferably a hemispherical dome-shape such that light can be radiated from all directions of the measuring target. The normal line in every direction thus can be measured. However, as long as the shape is such that light is radiated from a position corresponding to the normal direction to be measured, the shape of the light emission region may be of any shape. For instance, if the direction of the normal line of the surface is limited to substantially the vertical direction, the light does not need to be radiated in the horizontal direction (from direction of shallow angle).

Figure 4:
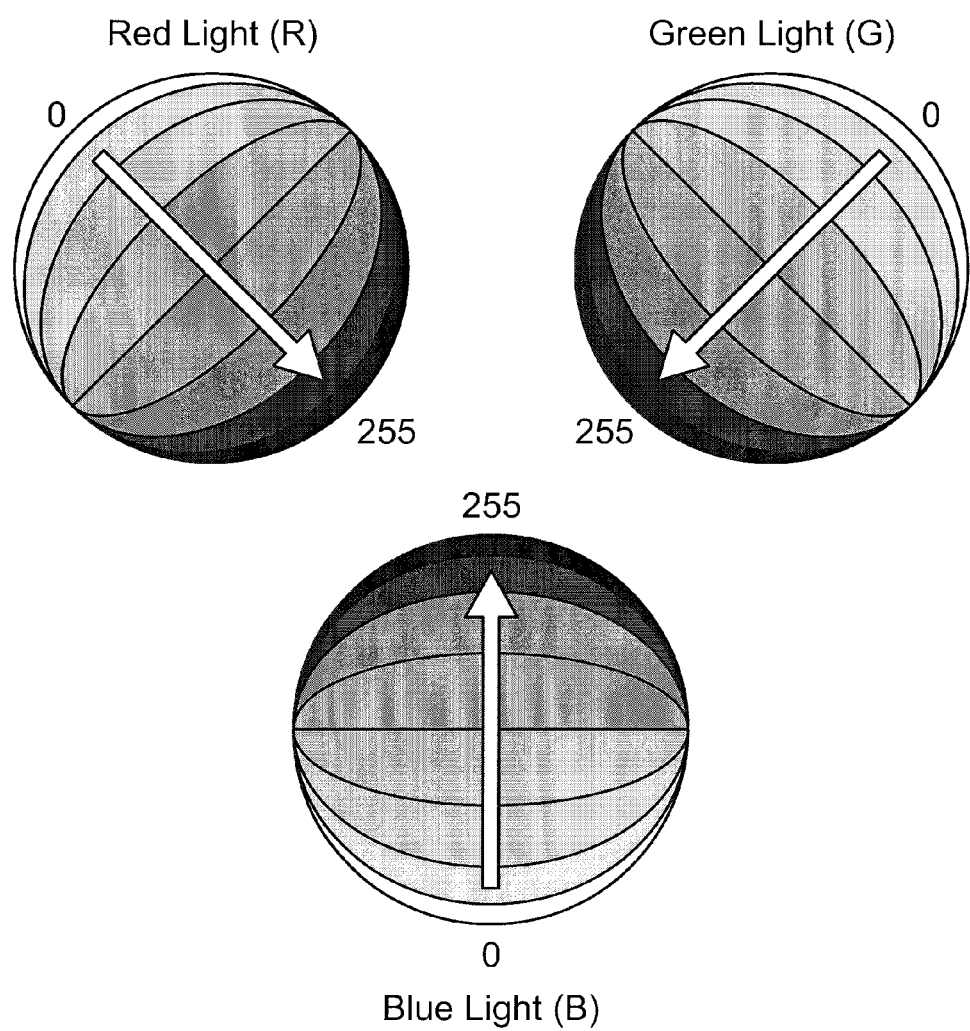
FIG. 4 shows a view showing a color pattern in a light emission region of the lighting device for every RGB.

The light emission at each position of the light emission region of the lighting device 3 is set to emit light of spectral distribution different at all positions. For instance, when light emission is realized by synthesizing light components of three colors of red light (R), green light (G), and blue light (B), the light emission intensity of each component of RGB is changed with respect to different directions on the dome as shown in FIG. 4. Here, the changing direction is set to 120 degrees with respect to each other. Through the combination of such RGB components, the light emissions at each position of the light emission region all have different combination of each component of RGB. Therefore, if the light of spectral distributions different at all positions is emitted, and the incident direction to the measuring target is different, the spectral distribution (intensity ratio of RGB) of the incident light can be set to be different.

Figure 5A:
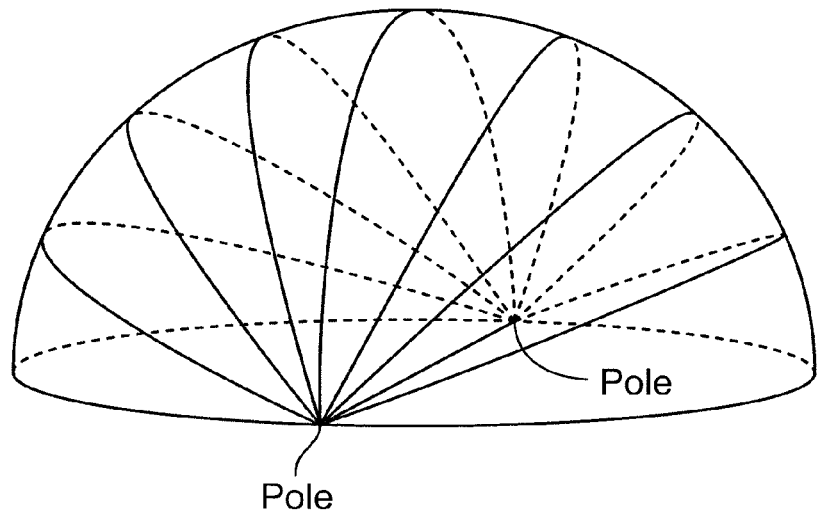
FIGS. 5A and 5B show views describing change in each color of RGB in the light emission region of the lighting device, where
Figure 5B:
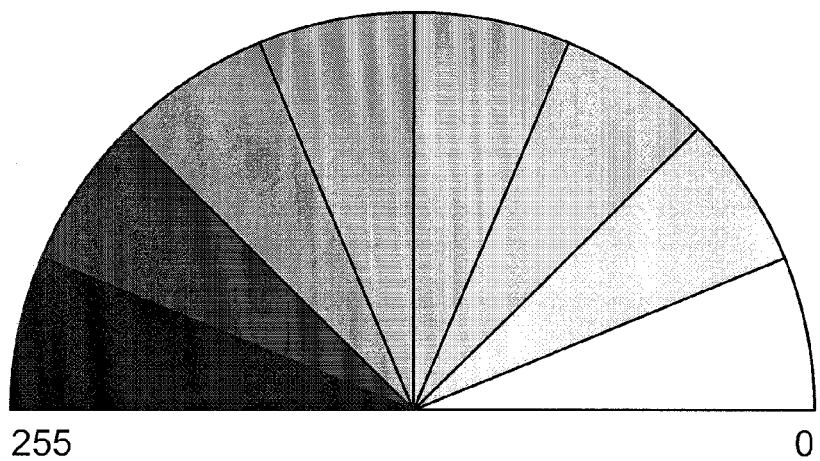

FIGS. 5A and 5B show change in intensity of one component light in FIG. 4. FIG. 5A is a perspective view showing an isochromatic line (equal light emission intensity) of one component light. FIG. 5B is a side view corresponding to FIG. 5A. A line of intersection of a plane passing through the diameter of the dome (hemisphere) and the dome becomes the isochromatic line. In FIGS. 4 and 5, the light emission intensity of each component of RGB is shown to change in a step-wise manner (in the figure, change in eight steps), but this is to facilitate the view of the drawing, and actually, the light emission intensity of each component light continuously changes. The change in light emission intensity is set to linearly change with respect to an angle. More specifically, assuming the minimum value of the light emission intensity is $L_{min}$, the maximum value of the light emission intensity is $L_{max}$, and the angle formed by the plane including the isochromatic line and the horizontal plane is θ, the light emission intensity is set so that the light emission intensity L(θ) on the isochromatic line satisfies the relationship $L(\theta)=L_{min}+(L_{max}-L_{min})\times(\theta/\pi)$. Defining "pole" as shown in FIG. 5A, θ is the longitude, and the light source distribution in the present embodiment can be expressed as linearly changing with respect to the longitude.

Figure 6:
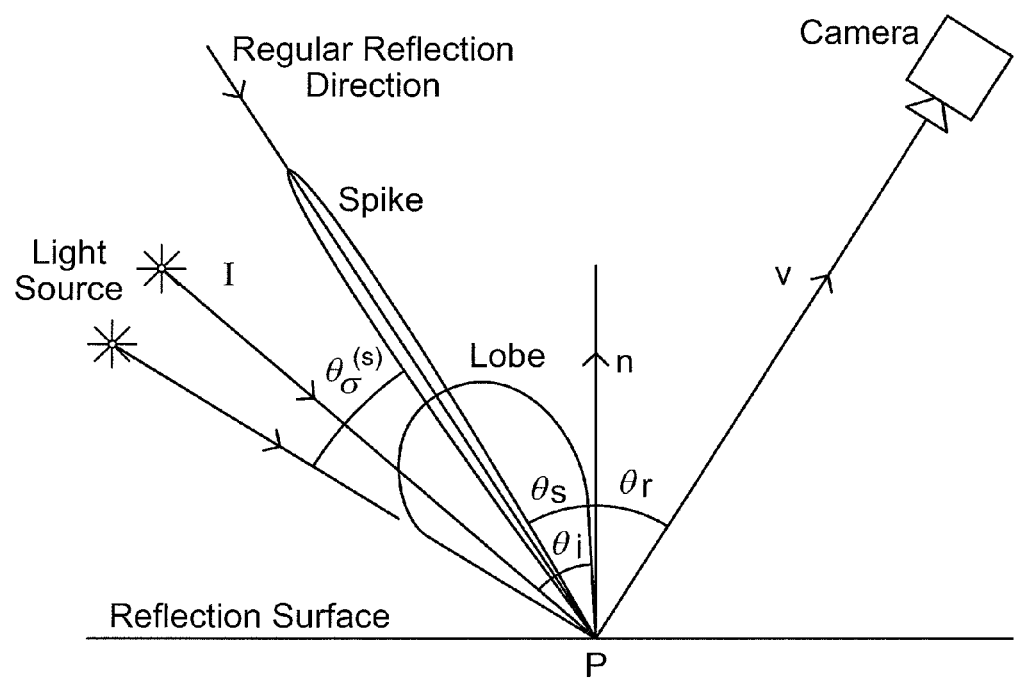
FIG. 6 shows a view describing reflectance property.

Through the use of the lighting device 3 having such light source distribution, the surface profile (normal) can be measured even with respect to the measuring target 4 in which the reflectance property is not uniform. Diffuse reflection occurs when the surface of the measuring target 4 is an imperfect mirror surface. Therefore, the reflected light of the light entered to the object surface includes sharp and narrow light (spike) in the regular reflection direction and faintly spread light (lobe) in the direction shifted from the regular reflection direction, as shown in FIG. 6. The lobe means the spread of the mirror surface reflected light generated by a micro irregular surface (microfacet) on the measuring target surface. The lobe spreads widely as a variation of the orientation of the microfacet increases, that is, as the surface is roughened. On the other hand, the surface comes close to the state of the perfect mirror surface with decreasing variation of the orientation of the microfacet. Here, the shift (angle) from the regular reflection direction and the ratio of the light intensity of the lobe with respect to the spike represent the reflectance property. The shape of the lobe differs according to the surface position in an object in which the reflectance property is not uniform. The ratio of the lobe and the spike comes close to 1, and the lobe and the spike are hardly distinguished from each other.

Figure 7A:
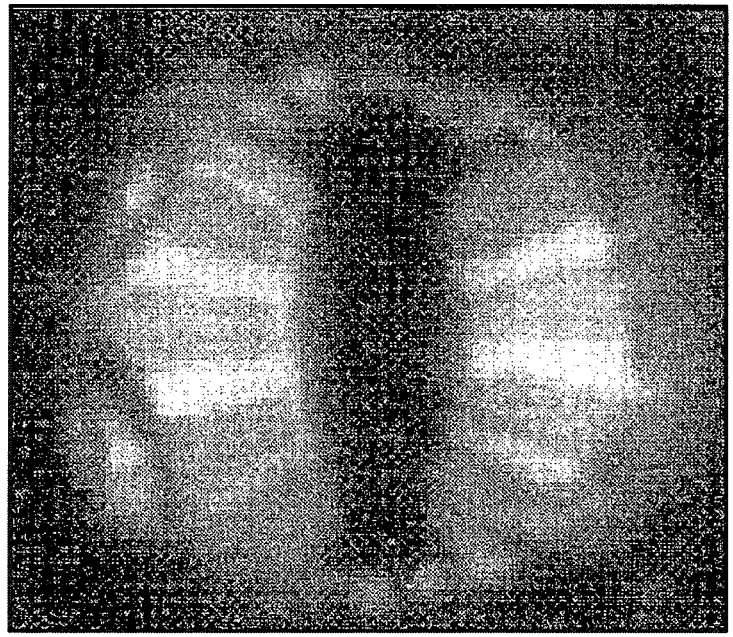
FIGS. 7A and 7B show photographed images in a case where a mirror surface object of FIG. 7A and an object of FIG. 7B in which reflectance property is not uniform are irradiated with lighting of a stripe-form color pattern, where the color pattern is broken in FIG. 7B.
Figure 7B:
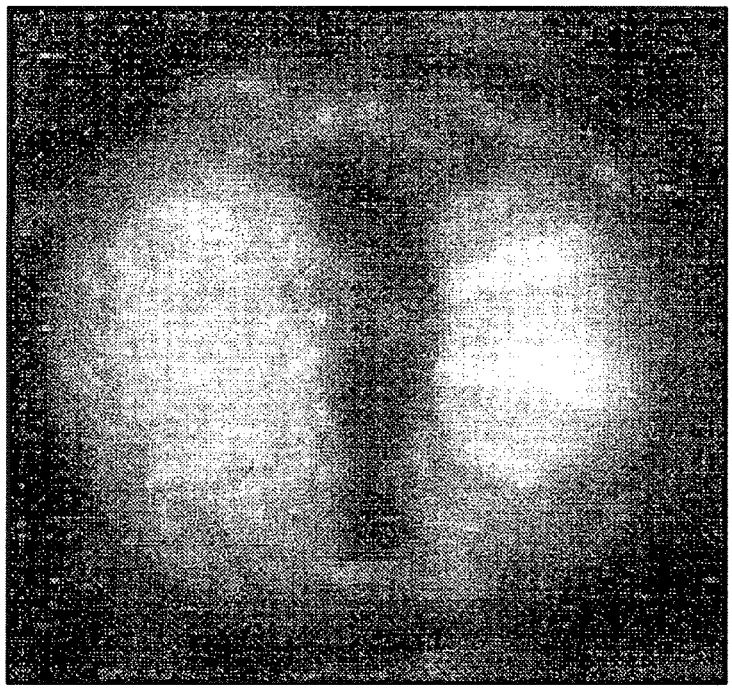

With the presence of spread of the lobe, the luminance value in the photographed image is subjected to influence of not only the light from the light emission region corresponding to the regular reflection direction of the object, but also the light from the periphery thereof. For instance, if a stripe-form lighting is projected as shown in FIG. 7A, the reflected light mixes with the surrounding light as shown on the left side of FIG. 7B in the diffuse object.

In this case, if the light from the periphery is canceled and color feature (R/(R+G) etc.) similar to the case of perfect mirror surface is maintained, it can be handled similar to as if performing the measurement with the object of perfect mirror surface as the target. The following description describes canceling the influence of light from the periphery by using the lighting pattern in the present embodiment to thereby enable photography of the image having a color feature similar to the case of the perfect mirror surface.

Figure 8:
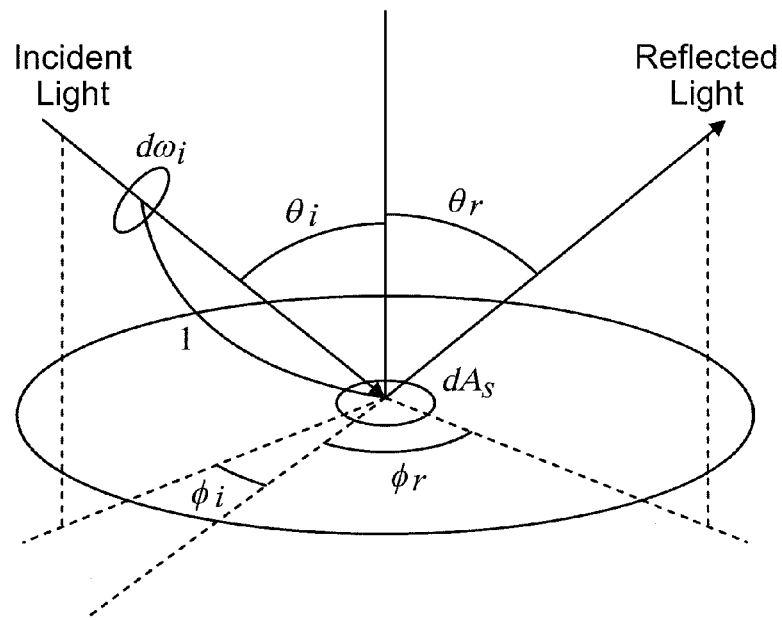
FIG. 8 shows a view for describing calculation of radiance.

As shown in FIG. 8, consider a light entering point p from $(\theta_i, \phi_i)$ direction, and being reflected in $(\theta_r, \phi_r)$ direction. A small solid angle in the $(\theta_i, \phi_i)$ direction at point p is dωi. Assuming a radiance from the small solid angle is $L_i(p, \theta_i, \phi_i)$, this can be considered as the radiance, that is, the light source distribution at $(\theta_i, \phi_i)$ on a sphere of radius one. Viewing a small region $dA_s$ including point p from the $(\theta_i, \phi_i)$ direction, the corresponding solid angle of this region is $dA_s \cos \theta_i$.

Therefore, the radiation illuminance $dE_i(p, \Omega)$ to point p by the light entering from the small solid angle $d\omega_i$ can be expressed as below.

$$dE_i(p, d\omega_i) = \frac{L_i(p, \theta_i, \phi_i)dA_s\cos\theta_i d\omega}{dA_s}$$

$$= L_i(p, \theta_i, \phi_i)\cos\theta_i d\omega$$

Therefore, the radiance $L_r(p, \theta_r, \phi_r)$ from point p to $(\theta_r, \phi_r)$ can be expressed as below using the reflectance property f of the object surface.

$$L_r(p, \theta_r, \phi_r) = \int_\Omega \int f(p, \theta_i, \phi_i, \theta_r, \phi_r) dE_i(p, d\omega_i) \quad (1)$$

$$= \int_\Omega \int f(p, \theta_i, \phi_i, \theta_r, \phi_r) L_i(p, \theta_i, \phi_i) \cos\theta_i d\omega_i$$

$$= \int_\Omega \int f(p, \theta_i, \phi_i, \theta_r, \phi_r)$$

$$L_i(p, \theta_i, \phi_i) \cos\theta_i \sin\theta_i d\theta_i d\phi_i$$

Here, $\Omega$ of the integral range represents the solid angle on the hemispherical surface, that is, the range of the light source distribution.

If the object surface is a perfect mirror surface, the radiance is expressed as below.

$$L_r(p, \theta_r, \phi_r) = L_i(p, \theta_{is}, \phi_{is} + \pi) \quad (2)$$

Here, $(\theta_{is}, \phi_{is})$ represents the regular reflection direction from position p in the $(\theta_r, \phi_r)$ direction.

Here, in an arbitrary region (range of light source distribution) $\Omega(\theta_{is}, \phi_{is})$ interiorly including $(\theta_{is}, \phi_{is})$, the target can be handled as if the target is the mirror surface even if the target surface is not a mirror surface considering the light source distribution $L_i(p, \theta_i, \phi_{is})$ satisfying (1)=(2). That is, the spectral characteristic in the regular reflection direction is always detectable even if the reflectance property of the measuring target changes. The light source distribution satisfying (1)= (2) can be expressed as being the light source distribution in which the radiance of the center of gravity of the light source distribution of a point symmetric region coincides with the radiance of the center of the point symmetric region in an arbitrary point symmetric region on the light emission region.

Since such light source distribution $L_i(p, \theta_i, \phi_i)$ is difficult to derive analytically, it is realistic to use approximation solution. The pattern (FIG. 5A) in which the luminance linearly changes with respect to the longitude direction as described above used in the present embodiment is one of such approximation solution. The lighting pattern (FIG. 4) combining such patterns is also an approximation solution. Furthermore, $L_i$ can be expressed by spherical harmonics expansion.

Figure 9:
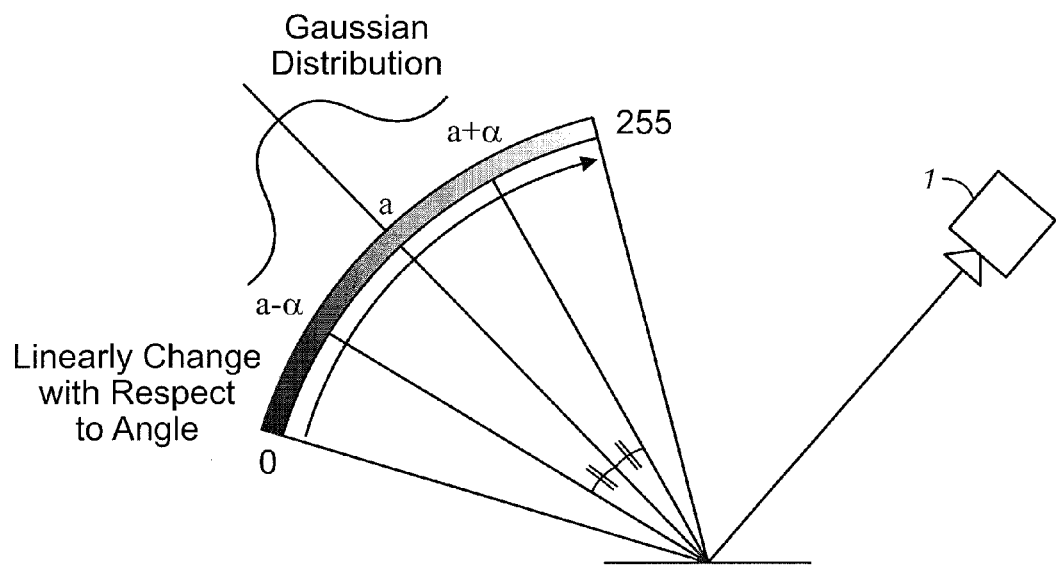
FIG. 9 shows a view describing effects by a color pattern of the lighting device in the first embodiment.

The canceling out of the influence of the lobe (diffuse reflection) by the lighting pattern in which the luminance linearly changes with respect to the longitude direction as shown in FIG. 5A is referenced from a different standpoint with reference to FIG. 9. FIG. 9 shows a view showing a one-dimensional direction of an equatorial direction in which effects close to an ideal are obtained to describe the effects by such lighting pattern. Here, consider only light from three points of an angle a (regular reflection direction), an angle a+α, and an angle a−α. The lobe coefficient of the light from the positions of the angles a+α, a−α is equal to each other, and is σ. The light emission intensity of the lighting device 3 is proportional to the angle (longitude), and is (a−α)L, aL, (a+α)L at the respective position of the angle of a−α, a, a+α. The synthesis of the reflected light from the three points becomes σ(a−α)L+aL+σ(a+α)L=(1+2σ)aL, and the influence of the diffusion light of the light from the periphery is canceled out. Only two points of a±α are considered here, but it should be easily understood that the influence of the diffusion light of the light from the periphery is completely canceled out. Therefore, the feature quantity represented by the ratio of the light emission intensity of each color of RGB becomes the same value as the case of the perfect mirror surface reflection.

The equatorial direction is the direction most ideal effects are obtained. In other directions, the linearity described above is broken and in a narrow sense, the influence of the diffuse reflection cannot be canceled out, but the influence of the diffuse reflection can be removed in a range not posing practical problems.

Figure 10A:
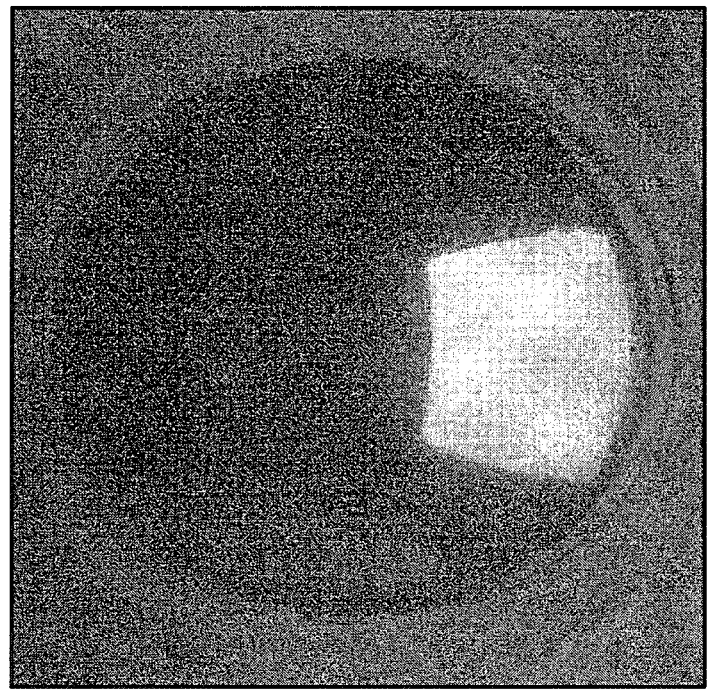
FIGS. 10A and 10B show photographed images in a case where a mirror surface object of FIG. 10A and an object of FIG. 10B in which reflectance property is not uniform are irradiated with lighting of the present embodiment, where the color pattern is maintained in FIG. 10B.
Figure 10B:
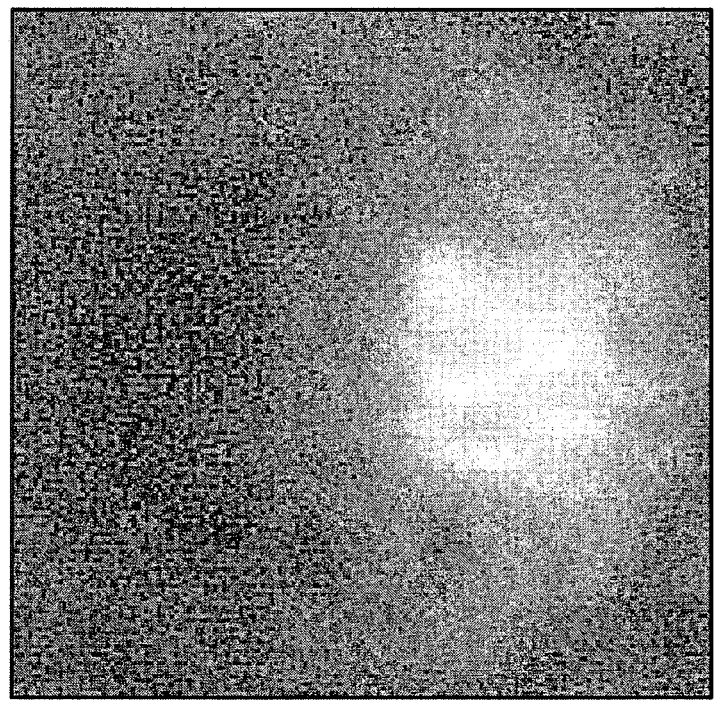

The periphery of the lighting region is blurred between a case in which the mirror surface object is irradiated with the lighting of the present embodiment as shown in FIG. 10A and a case in which the object in which the reflectance property is not uniform is irradiated with the lighting of the present embodiment as shown in FIG. 10B, but the color feature is maintained in the interior. Therefore, even when targeting the object in which the reflectance property is not uniform, the surface profile can be acquired similar to the case of the perfect mirror surface reflection.

Figure 11:
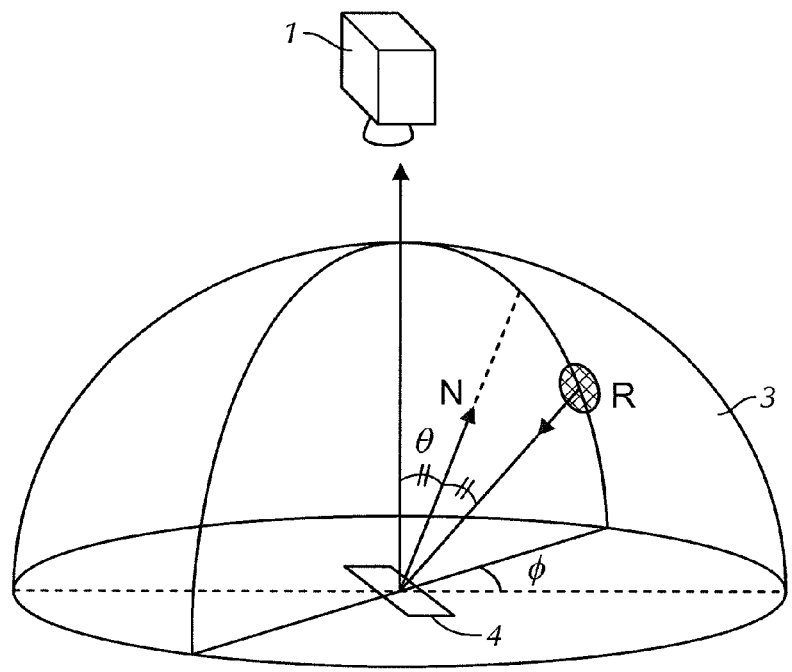
FIG. 11 shows a view describing a correspondence of a direction of a normal line of a surface to be measured and a light emission region.

As described above, through the use of the lighting device 3 according to the present embodiment, the target can be handled the same way as the perfect mirror surface object irrespective of the reflectance property of the measuring target. The lighting pattern of the lighting device 3 combines patterns in which RGB gradually changes in different directions, as shown in FIG. 4, and thus light of spectral distribution different at all positions is emitted. Through the use of the lighting device 3 that emits light of spectral distribution different at all positions of the light emission region, the surface profile (normal) of the measuring target 4 can be measured from only one image. This will be described with reference to FIG. 11. Assume the direction of the normal line at a certain position on the surface of the measuring target 4 is the direction of an arrow N, the zenith angle is θ, and the azimuth angle is φ. In this case, the color of the position photographed by the camera 1 becomes the reflected light of the light emitted in the region R of the lighting device 3 and entered to the measuring target 4. Thus, the direction (θ, φ) of the normal line of the surface and the direction of the incident light (position in the light emission region of the lighting device 3) correspond at one to one. Since the light entered from different directions have different spectral distributions (emitting light of spectral distribution different at all positions in the light emission region), the lighting device 3 can examine the color (spectral distribution) of the photographed image to calculate the direction of the normal line at the relevant position for both the zenith angle and the azimuth angle.

[Normal Calculation Section]

Figure 12:
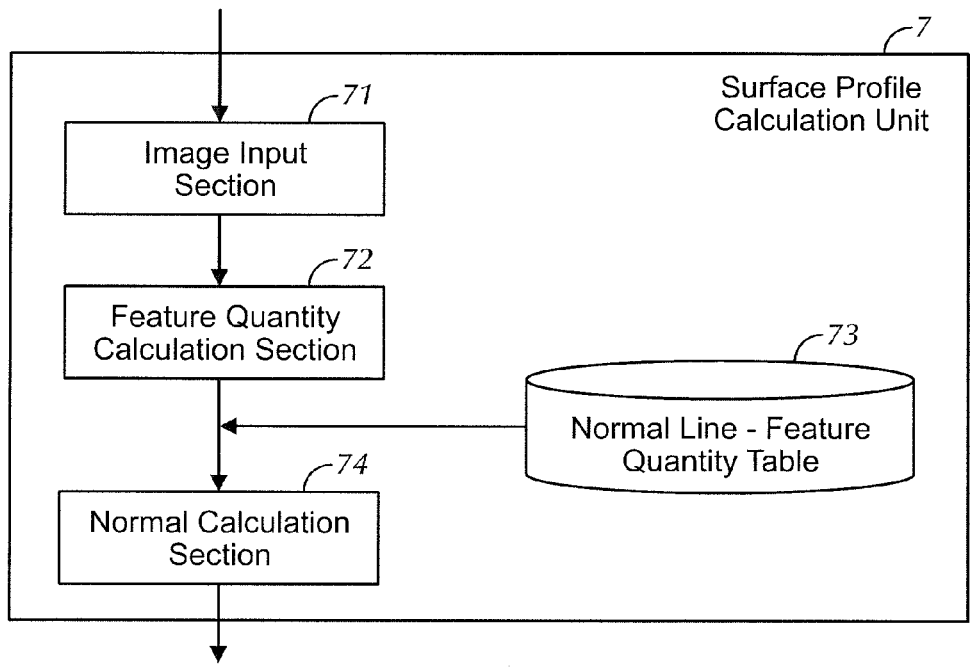
FIG. 12 shows a view showing function blocks of a surface profile calculation unit.

The details of the surface profile calculation process will be described below while describing the surface profile calculation unit 7 in the computer 6. FIG. 12 shows a view showing more detailed function blocks of the surface profile calculation unit 7. As shown in the figure, the surface profile calculation unit 7 includes an image input section 71, a feature quantity calculation section 72, a normal line—feature quantity table 73, and a normal calculation section 74.

The image input section 71 is a function section for accepting the input of images photographed by the cameras 1, 2. When receiving the analog data from the cameras 1, 2, the image input section 71 converts the analog data to digital data. The image input section 71 may receive image of digital data by USB terminal, IEEE 1394 terminal, and the like. In addition, a configuration of reading images from a portable storage medium through a LAN cable may be adopted.

The feature quantity calculation section 72 calculates the feature quantity related to the spectral component of the reflected light for each pixel reflecting the measuring target 4 from the input photographed image. In the present embodiment, the lighting device 3 projects light combining three component lights of red light (R), green light (G), and blue light (B), and thus the ratio of each component of RGB is used for the feature quantity. For instance, for each component of RGB, the combination of (R, G, B) is set as the feature quantity after normalizing the maximum luminance at one. The ratio of another color with respect to a certain color (here, G) such as the combination of the values of R/(R+G), B/(B+G) and G may be set as the feature.

As described above, the color of the measuring target 4, that is, the feature quantity calculated by the feature quantity calculation section 72 correspond to the direction of the normal line at one to one. The normal line—feature quantity table 73 is a storage section for storing such correspondence relationship. The normal line—feature quantity table 73 can be created by performing photography using the lighting device 3 and the cameras 1, 2 on an object which shape such as perfect sphere is known, and examining the correspondence relationship between the normal line and the feature quantity in advance. For instance, when using an object of a perfect sphere, the direction of the normal line can be obtained through calculation by examining the position from the center of the focusing pixel. The correspondence relationship between the direction of the normal line and the feature quantity can be examined by calculating the feature quantity at the relevant position.

The normal calculation section 74 calculates the direction of the normal line at each position of the measuring target from the feature quantity calculated from the input image, and the normal line—feature quantity table 73.

<Effects of Embodiment>

1. Surface Profile of an Object in Which the Reflectance Property is Not Uniform is Measurable As described above, the profilometer according to the present embodiment can photograph an image having spectral characteristics similar to a perfect mirror surface even on a target in which the reflectance property is not uniform. Therefore, even with respect to a target in which the reflectance property is not uniform, or even with respect to a target in which the reflectance property is uniform but is different from the reflectance property of the reference object, the surface profile (direction of normal line) thereof can be calculated with satisfactory accuracy.

The following additional effects can be obtained by using the lighting device 3 of the present embodiment.

2. Normal Line can be Calculated Only from One Image

The profilometer according to the present embodiment uses the lighting device such that light of different spectral distribution enters for all incident angle directions, and thus the direction of the normal line of the object to be measured can be obtained only from one image with respect to both the zenith angle component and the azimuth angle component. Since the photographing of the image is performed only once, and the calculation of the direction of the normal line is carried out by simply examining the table storing the correspondence relationship of the normal line and the feature quantity, the surface profile of the measuring target can be easily (at high speed) measured.

3. Natural Observation is Possible on Diffuse Object

Figure 13:
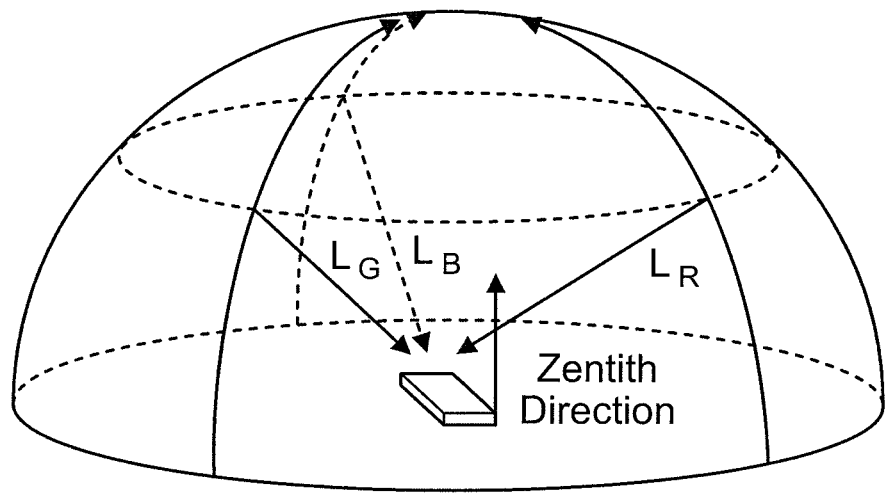
FIG. 13 shows a view describing effects by a color pattern of the lighting device in the first embodiment.

When photographing a diffuse object (equal diffuse object), the image is a mixture of incident light from various directions. In the present embodiment, the light emission region of the lighting device 3 has the light of three components of RGB changed in equal directions (direction of 120 degrees with respect to each other) as shown in FIG. 4 and the degree of change is set the same. Therefore, as shown in FIG. 13, with respect to an arbitrary zenith angle, the sum of the light intensity per one color from all azimuth angle directions at the relevant zenith angle is the same in each color. The sum of the light intensity of each color is the same even if integration is performed for all zenith angles. Thus, the component light of RGB of the light entering the camera 1 positioned in the vertical direction from the diffuse object all have the same intensity, and the photographed image thereof has white reflected light photographed with respect to the diffuse object. That is, when the photographing object is configured from both the mirror surface object (object to be measured) and the diffuse object, the surface profile of the mirror surface object can be measured, and photography in natural light becomes possible for the diffuse object. For instance, when carrying out a joining test of a solder, a natural test can be performed with a colorless image for targets other than the solder.

4. Alleviation of Luminance Dynamic Range Problem

Through the use of the lighting device of the present embodiment, even if an object including perfect mirror surface and a few lobes coexists, the luminance of the regular reflection light and the diffusion light becomes small compared to a case where observing them under a point light source (parallel light). Therefore, the dynamic range of the input image does not need to be widened.

<Variant>

Figure 14A:
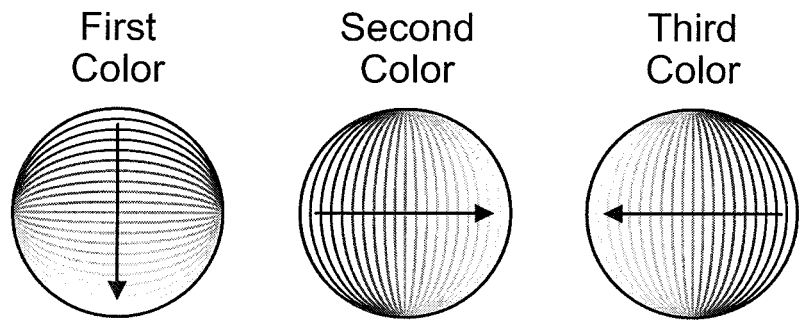
FIGS. 14A and 14B show views showing another example of a color pattern of the lighting device.
Figure 14B:
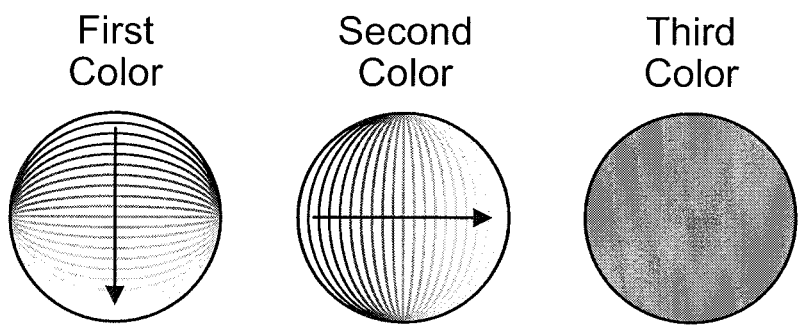

In the description of the embodiment above, the lighting device in which patterns that change with angle with respect to a direction in which the light emission intensity of three colors of RGB differs by 120 degrees are overlapped is used, but the light emission pattern is not limited thereto. For instance, a combination of patterns in which the three colors respectively change with respect to different directions such as patterns in which three colors change to downward direction, rightward direction, and leftward direction as shown in FIG. 14A may be used. All three colors do not need to be changed with angle, and a pattern that emits light at uniform luminance at the entire surface for one color, and patterns that change with angle in different directions for the other two colors as shown in FIG. 14B may be adopted.

The light emission of the lighting device 3 of the present embodiment is configured to also exhibit the above-described additional effects. If only the effect that the object in which the reflectance property is not uniform can be photographed same as the perfect mirror surface is to be obtained, the lighting patterns of three colors of RGB do not need to be overlapped. For instance, the lighting of RGB that respectively linearly changes with angle may be sequentially lighted to photograph three images, and the three images may be analyzed to calculate the surface profile of the measuring target.

In the above description, the image is photographed in advance using an object which shape is known, the relationship between the feature quantity of the spectral distribution and the direction of the normal line is obtained based on the image, and the normal line—feature quantity table is created. The direction of the normal line is obtained from the feature quantity of the spectral distribution of the measuring target with reference to the normal line—feature quantity table. However, if the relationship of the direction of the normal line and the spectral distribution photographed by the camera can be formulated from the geometric arrangement and the like, the normal line may be calculated using such calculation formula.

(Second Embodiment)

Figure 15A:
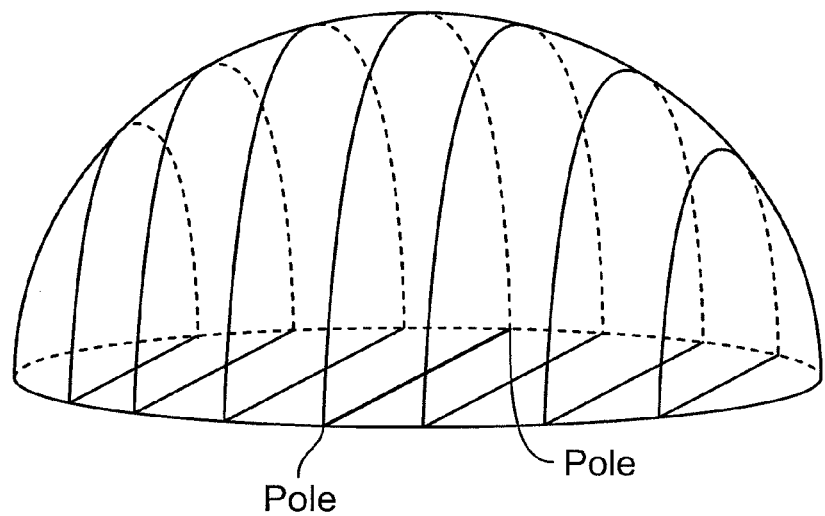
FIGS. 15A and 15B show views showing a color pattern of a lighting device in a second embodiment.
Figure 15B:
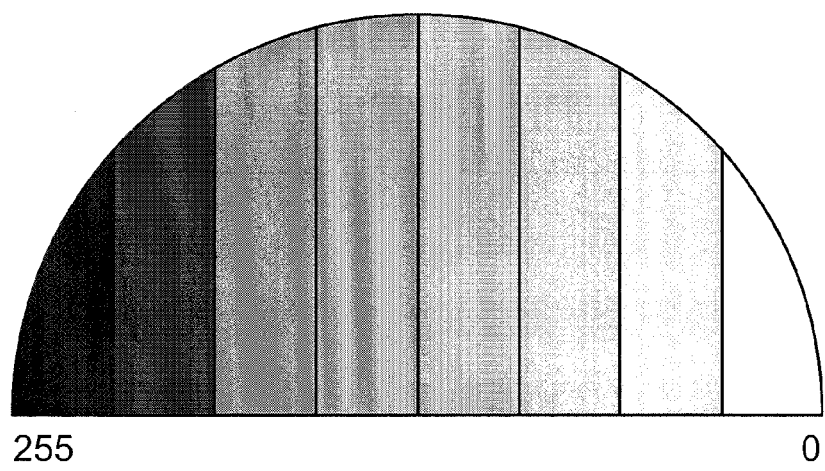

In the first embodiment, a pattern in which the light emission intensity linearly changes with respect to the angle in the longitude direction as shown in FIG. 5A is used as an approximation solution of a lighting pattern with which the spectral characteristics in the regular reflection direction can always be detected in the photographed image even if the reflectance property changes. In the present embodiment, a pattern in which the light emission intensity linearly changes with respect to a latitude direction as shown in FIG. 15 is adopted. Such lighting pattern is also one approximation solution, and the influence of diffusion light can be substantially canceled out to enable the detection of the regular reflection light.

(Third Embodiment)

Figure 16:
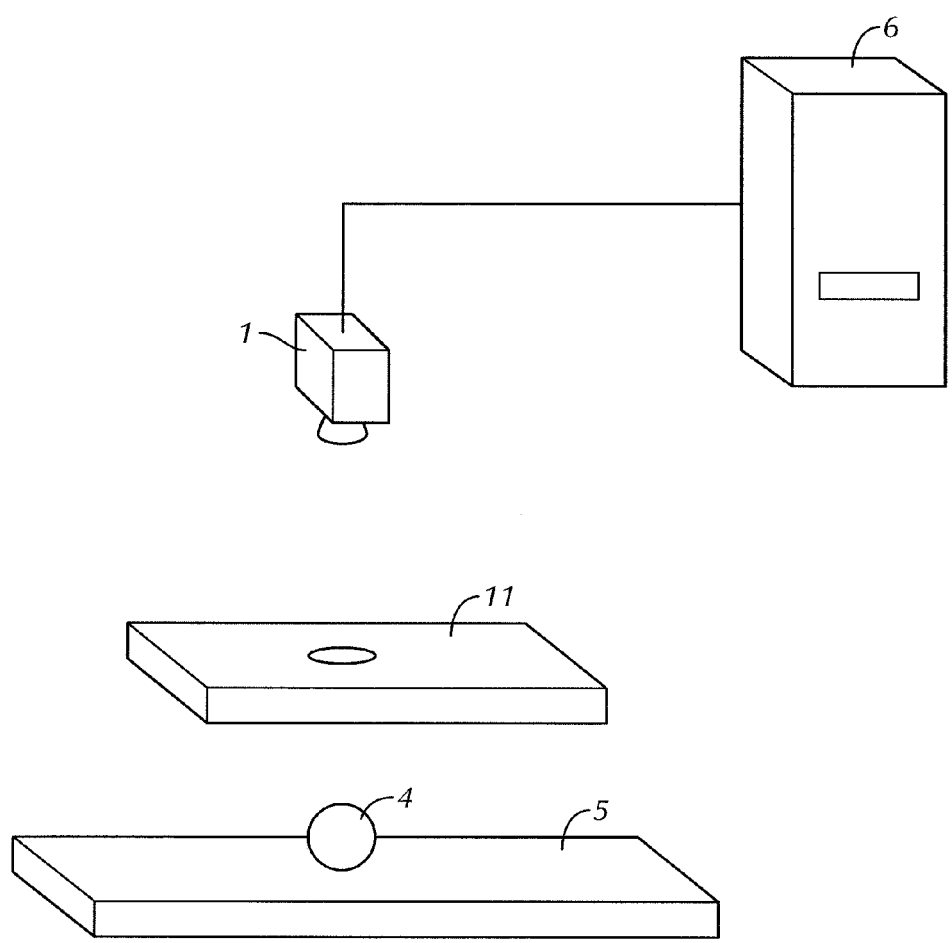
FIG. 16 shows a view showing a brief overview of a three-dimensional measurement device according to the second embodiment.
Figure 17:
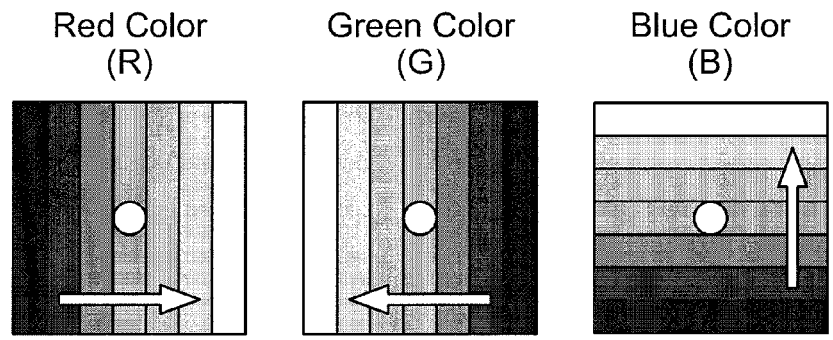
FIG. 17 shows a view showing a color pattern in the second embodiment for every RGB.

In a profilometer according to the third embodiment, a lighting device having a shape different from the first and the second embodiments is used. As shown in FIG. 16, a flat plate-shaped lighting device 11 is used in the present embodiment. In the present embodiment as well, the spectral distribution of the light emission at each position in the light emission region is differed at all positions. Specifically, similar to the first embodiment, when determining light emission by synthesis of light components of three colors of red light (R), green light (G), and blue light (B), each color is changed with respect to different directions as shown in FIG. 17. Here, the light emission intensity of R becomes larger towards the rightward direction, the light emission intensity of G becomes larger towards the leftward direction, and the light emission intensity of B becomes larger towards upward direction. The proportion of change in the light emission intensity is linear with respect to position (distance).

The lighting pattern in which the light emission intensity linearly changes with respect to position on a plane is one approximation solution of a lighting pattern that cancels out the influence of diffusion light. Therefore, through the use of such lighting pattern, the calculation of the surface profile can be performed similar to the perfect mirror surface regardless of the reflectance property of the measuring target.

The light combining each component light of RGB has different spectral distribution at all positions. Therefore, in the present embodiment as well, the surface profile of the measuring target can be obtained only from one photographed image, similar to the first embodiment.

<Other Embodiments of the Present Invention>

The basic idea of the present invention will supplementarily be described from other view points, and other embodiments of the present invention will be described.

As shown in FIG. 6, it is considered that a normal vector n of the surface of the measuring target, an eye vector v of the camera, and a light beam vector l from the light source exist on the same plane passing through the measurement point P. Assuming that $\theta_r$ is an angle formed between the eye vector v and the normal vector n and $\theta_s$ is a regular reflection angle, $\theta_r = \theta_s$ is obtained.

The spread of the lobe in the surface of the measuring target is defined by $\theta_\sigma^{(s)}$ based on $\theta_s$. The lobe is symmetrically distributed about an axis in the regular reflection angle direction. $\theta_\sigma^{(s)}$ also means that "the arrangement angle of the light source that is able to be observed by the camera and located farthest away from $\theta_s$ (angle is maximally opened)". That is, the radiance of the light source arranged in the local region of $\pm \theta_\sigma^{(s)}$ centering on the regular reflection angle direction $\theta_s$ has an influence on the intensity of the reflected light observed by the camera. $\theta_\sigma^{(s)}$ depends on the reflectance property of the surface of the measuring target. The surface having the small value of $\theta_\sigma^{(s)}$ exhibits the mirror-like reflectance property. The suffix σ of $\theta_\sigma^{(s)}$ is a parameter expressing a difference of the material.

The luminance value observed by the camera is proportional to the following value:

$$\int_A L(\theta) R_\sigma(\theta - \theta_s) d\theta \quad (3)$$

Here, L(θ) is a light source distribution expressing the radiance emitted from the light source having the angle θ toward the direction of the measurement point P. $R_\sigma(\theta)$ is a reflectance property distribution of the measuring target and expresses a ratio of the luminance reflected as the lobe in the direction of the eye vector v in the light emitted from the light source that is away from the regular reflection angle direction by the angle θ. A is a region of $\theta_s - \theta_{\sigma max}^{(s)} \le \theta \le \theta_s + \theta_{\sigma max}^{(s)}$, and the suffix σmax is a parameter corresponding to the largest spread of the lobe in the envisioned measuring target.

Figure 22:
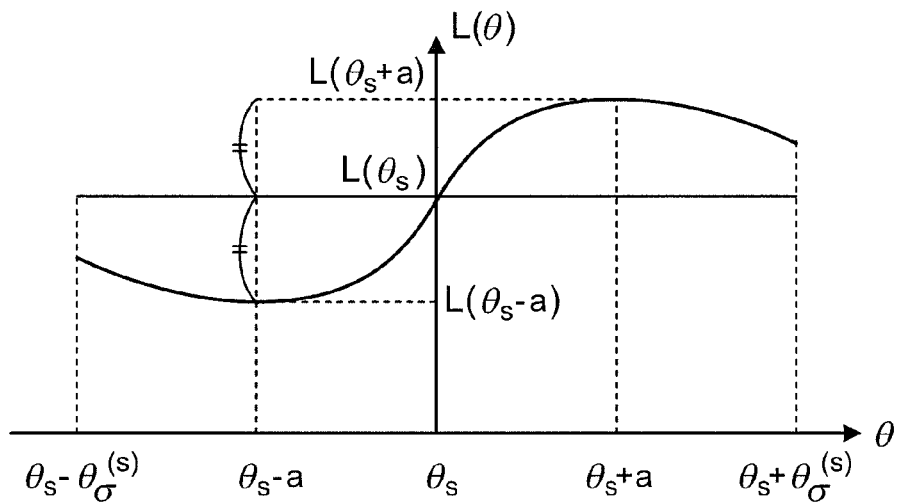
FIG. 22 shows a view showing an example of a light source distribution in which an influence of lobe is canceled.

In this case, the light source distribution L(θ) is not zero in the range of at least the region A, and the light source distribution L(θ) is set so as to satisfy the following equation for arbitrary a satisfying $0 < a \le \theta_{\sigma max}(s)$ (see FIG. 22);

$$L(\theta_s - a) + L(\theta_s + a) = 2 \times L(\theta_s) \quad (4)$$

This condition also means that the light source distribution L(θ) is an odd function for a point $(\theta_s, L(\theta_s))$. When the condition is satisfied, the light source distribution L(θ) has the predetermined offset value $L(\theta_s)$ in the range of the region A, and energy radiated from a region $(\theta_s - \theta_{\sigma max}^{(S)} \le \theta < \theta_s)$ having an angle smaller than the regular reflection angle $\theta_s$ and energy radiated from a region $(\theta_s < \theta \le \theta_s + \theta_{\sigma max}^{(S)})$ having an angle larger than the regular reflection angle $\theta_s$ cancel each other based on $L(\theta_s)$. In other words, the influence of the lobe derived from the light emitted from the region $(\theta_s - \theta_{\sigma max}(s) \le \theta < \theta_s)$ having the angle smaller than the regular reflection angle $\theta_s$ and the influence of the lobe derived from the light emitted from the region $(\theta_s < \theta \le \theta_s + \theta_{\sigma max}^{(S)})$ having the angle larger than the regular reflection angle $\theta_s$ cancel each other (called lobe cancel effect). Therefore, the influence of the lobe can be ignored, and the reflected light of the surface of the measuring target can be observed similarly to the perfect mirror surface. That is, the following relational expression holds:

$$\forall \sigma \in \sigma_{max}, \int_A L(\theta) R_\sigma(\theta - \theta_s) d\theta = k_\sigma L(\theta_s) \quad (5)$$

Here, $k_\sigma$ is a coefficient (reflectance) depending on the reflectance property of the measuring target.

(In the case where $k_\sigma$ and n are known)

When the coefficient $k_\sigma$ and the orientation n of the normal vector are known, a determination whether the normal vector of the surface of the measuring target is n can be made from the luminance of the reflected light observed by the camera using the equation (5) "irrespective of the degree of the spread of the lobe".

Figure 23:
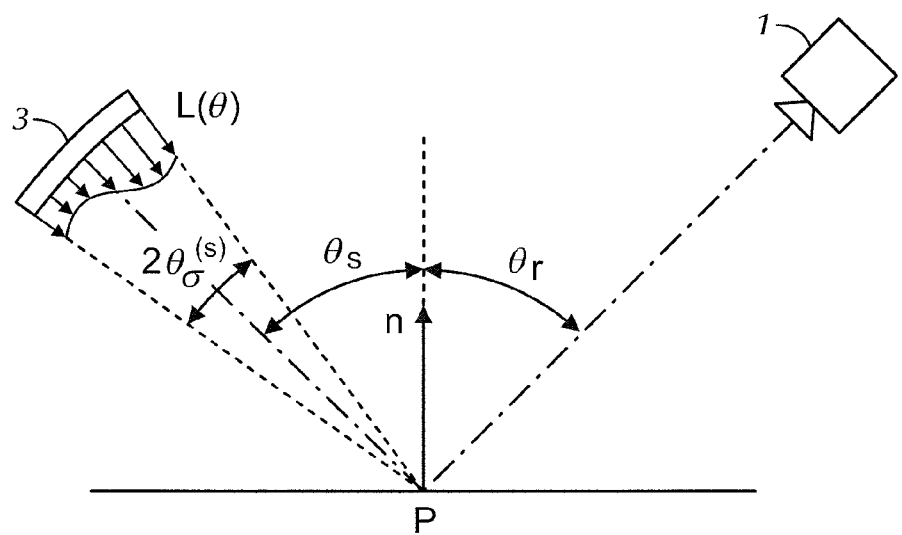
FIG. 23 shows a view showing a configuration example of a measuring apparatus.

FIG. 23 shows a configuration example of the measuring apparatus (observing apparatus). The surface of the measuring target is arranged at the measurement point P, and it is assumed whether the normal vector of the surface of the measuring surface is matched with n is measured. The camera 1 is properly arranged (it is assumed that $\theta_r$ is an eye direction of the camera 1). The lighting device 3 is arranged in the direction of the regular reflection angle $\theta_s$ ($=\theta_r$) that is uniquely determined from the camera arrangement. The extent of the light emission region of the lighting device 3 is set to a value large than the envisioned maximum value $2\theta_{\sigma max}^{(s)}$ of the spread of the lobe of the measuring target. The sectional shape of the lighting device 3 is not limited to the arc, but the sectional shape of the lighting device 3 may be a straight line or a curved line except the arc. The light source distribution L(θ) of the lighting device 3 is set so as to satisfy the condition of the equation (4). In FIG. 23, an arrow toward the measurement point P from the lighting device 3 schematically shows the radiance L(θ) directed toward the measurement point P from each light emission element in the light emission region.

In order to obtain the lighting device 3, for example, a plurality of LEDs are arrayed along the section of the lighting device 3, and the brightness of each of the LEDs is adjusted based on the value of $L(\theta)$ corresponding to the arrangement angle $\theta$ of the LED. A diffuser plate is arranged in front of the LED such that the light source radiance can impinge on the point P from any angle. Therefore, even in the perfect mirror surface object, the reflected light can always be observed at the point P from the camera 1. In such a configuration, the radiance of the light emitted from each light emission element is line-symmetrically distributed in relation to the straight line passing through the light emission element and the measurement point P.

The object whose coefficient $k_\sigma$ is known is previously arranged at the point P such that the orientation of the normal vector is matched with n, the luminance of the reflected light is measured with the camera 1, and the value of the luminance is stored in the information processing device (the processing is called teaching). When the measuring target is inspected, the object is placed at the measurement point P, and the luminance of the reflected light is measured with the camera 1. The determination whether the orientation of the normal vector of the measuring target is n can easily be made by comparing the measured value to the previously-stored value. For example, the measuring apparatus is utilized for a flaw inspection of the object surface.

(In the case where $k_\sigma$ is unknown)

When $k_\sigma$ is unknown, two kinds of the light source distributions may be used. For example, two kinds of the light source distributions $L_1(\theta)$ and $L_2(\theta)$ are prepared, the measuring target is irradiated with the pieces of light emitted from the light sources, and the imaging is performed with the camera, which allows the following vector $I_\sigma$ to be calculated:

$$I_\sigma = (\int_A L_1(\theta) R_\sigma(\theta - \theta_s) d\theta, \int_A L_2(\theta) R_\sigma(\theta - \theta_s) d\theta) \quad (6)$$

When the angle formed between the light source direction corresponding to $I_\sigma$ and the normal vector of the measuring target is equal to $\theta_s$, that is, when the orientations of the vector $I_\sigma$ and vector $(L_1(\theta_s), L_2(\theta_s))$ are identical to each other, the determination whether the normal vector of the measuring target is n can be made. The condition that "the orientations of the vector $I_\sigma$ and vector $(L_1(\theta_s), L_2(\theta_s))$ are identical to each other" is expressed by the following relational expression:

$$I_\sigma = \alpha(L_1(\theta_s), L_2(\theta_s)) \quad (7)$$

Specifically, a feature value in which the coefficient $k_\sigma$ is eliminated is determined by calculating the intensity ratio of the pieces of reflected light observed in the two kinds of the light source distributions, and the orientation of the normal vector of the measuring target can be determined using the feature value. When at least the two kinds of the light source distributions are used, for example, the surface of the measuring target is simultaneously irradiated with the pieces of light such as R and G which have different wavelengths, and the pieces of reflected light are separated on the camera side. Therefore, advantageously the measurement is performed by only one-time imaging.

(In the Case Where n is Plural or Unknown)

Figure 24:
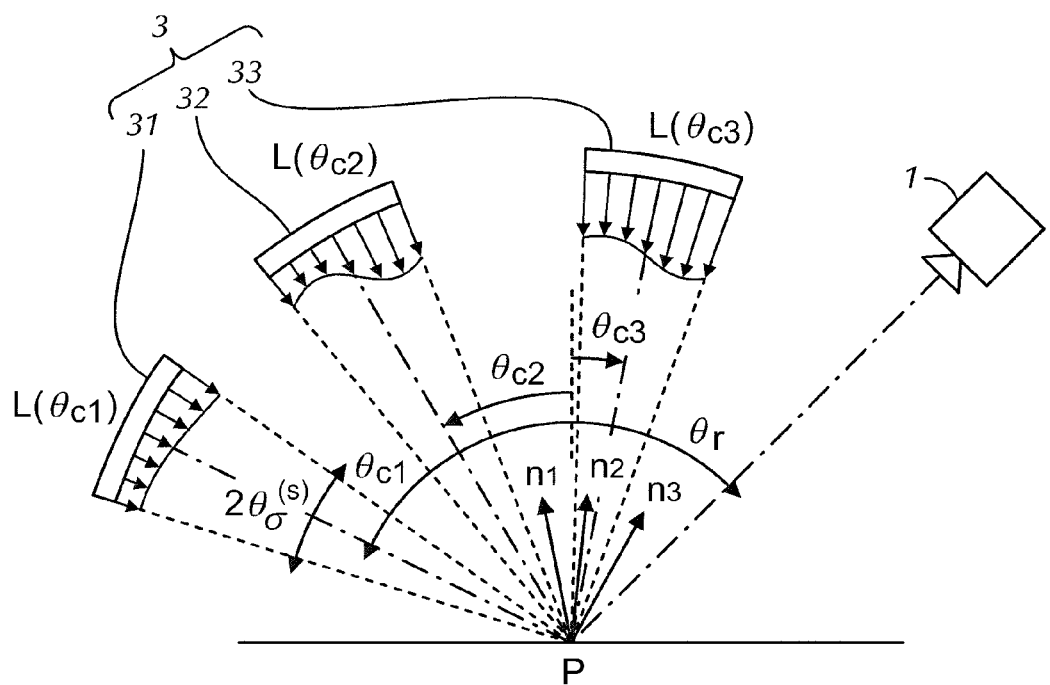
FIG. 24 shows a view showing a configuration example of a measuring apparatus.

When the orientation n of the normal vector is plural or unknown, plural regions (referred to as specific regions) satisfying the equation (5) or (7) may be provided in the lighting device 3. FIG. 24 shows an example in which three specific regions 31 to 33 are provided. The extents of the specific regions 31 to 33 are set such that the spreads in the $\theta$ direction are equal to one another (that is, the lengths of the arcs are equal to one another when the specific regions 31 to 33 are projected to the circle having the unit radius centering on the point P). Radiances $L(\theta_{C1})$ to $L(\theta_{C3})$ of light emission center $\theta_{C1}$ to $\theta_{C3}$ of the specific regions 31 to 33 are set so as to be different from one another. When at least the two kinds of the light source distributions are used, the radiance ratio of the light emission centers $\theta_{C1}$ to $\theta_{C3}$ may be set so as to be different from one another in each specific region. In this configuration, the determination whether the orientation of the normal vector of the surface of the measuring target is n1, n2, or n3 can be made based on the intensity of the reflected light observed by the camera 1.

The arrangements and the number of specific regions are arbitrary. Resolution of the angle measurement is enhanced, as the number of specific regions increases, or as a distance (angle) between light emission centers of the specific regions is narrowed. FIG. 24 shows an example in which the specific regions are separated from each other. Alternatively, the specific regions may be in contact with each other, or the specific regions may overlap each other. For example, in the light source distribution of FIG. 5, many specific regions are provided while overlapping one another, and the radiance of the light emission center in the specific region changes in the continuous or stepwise manner according to the angle $\theta$. An arbitrary angle (normal direction n) can be measured using the light source distribution having a semi-arc range $(-\pi \leq \theta \leq \pi)$ of FIG. 5.

In order to be able to measure an arbitrary normal direction n, it is necessary that the light source distribution $L(\theta)$ satisfy the equation (5) or (7) for arbitrary $\theta$. That the light source distribution $L(\theta)$ is a linear expression of $\theta$ is an example satisfying the equation (5) or (7). There are roughly three methods for calculating $L(\theta)$ satisfying the equation (5) or (7) for an arbitrary normal direction n.

(A) Theoretical Calculation

The reflectance property and the like are modeled like the equation (5) or (7), and $L(\theta)$ satisfying the reflectance property and the like are analytically obtained. That the equation (4) or $L(\theta)$ is the linear expression of $\theta$ is an example of a specific solution.

(B) Derivation by Simulation

When the normal of the measuring target has two degrees of freedom, the analysis becomes difficult by the method (A). In such cases, $L(\theta)$ is calculated by a simulation such that a residual errors (such as square error) of the left side and the right side in the equation (5) or (7) becomes the minimum in any combination of the light sources. For the purpose of efficient calculation, $L(\theta)$ is modeled (for example, second-order or third-order polynomial of $\theta$ or spherical surface harmonic function), and the model parameters may be calculated by a least square method or the like.

(C) Empirical Derivation from Experiment

The lighting device is structured by actually arranging plural light sources (such as LEDs). As shown in FIG. 24, the camera 1 is fixed, and the luminance of the reflected light is observed while the orientation (normal vector n) of the measuring target is changed. The brightness of each light source is adjusted such that a difference with the luminance value in observing the perfect mirror surface object becomes the minimum.

As described above, the lighting is performed in one plane using one or two light source distributions satisfying the equation (5) or (7), which allows the normal direction to be measured in the plane.

When the normal direction is measured with the two degrees of freedom, in the two planes different from each other, the lighting is performed using the light source distributions satisfying the equation (5) or (7), and the reflected light may be observed by the camera. The number of light source distributions to be combined depends on the degree of freedom of the normal direction to be calculated or the fact that the reflectance property of the measuring target is known.

For example, when the normal direction has the two degrees of freedom while the reflectance property is unknown, it is necessary to use at least three different light source distributions. When the reflectance property is known, or when the normal direction has the one degree of freedom even if the reflectance property is unknown, the two different light source distributions may be used. As described above, when the reflectance property is known while the normal direction is known, one light source distribution may be used.

What is claimed is:

1. A profilometer for measuring a surface profile of a measuring target, the profilometer comprising:
    a lighting device that irradiates the measuring target with light;
    an imaging device that images a reflected light from the measuring target; and
    a normal calculation section that calculates a normal direction of a surface at each position of the measuring target from an imaged image,
    wherein the lighting device comprises:
        a light emission region of a predetermined width,
        wherein, with respect to an arbitrary point symmetric region set in the light emission region, a radiance at a center of gravity of a radiance distribution in the arbitrary point symmetric region coincides with a radiance at a geometric center of the arbitrary point symmetric region.

2. The profilometer according to claim 1,
    wherein in the lighting device, when a light source distribution entering a measurement point p from a direction of an incident angle $(\theta, \phi)$ is $L_i(p, \theta, \phi)$, the radiance of the imaged image is equal to $Li(p, \theta_{is}, \phi_{is}\pm\pi)$,
    wherein $$\int\int_\Omega L_i(p, \theta_i, \phi_i) \cdot f(p, \theta_i, \phi_i, \theta_r, \phi_r)\cos\theta_i\sin\theta_i d\theta_i d\phi_i = L_i(p, \theta_{is}, \phi_{is} \pm \pi)$$

is satisfied for an arbitrary normal vector on the p and an arbitrary region $\Omega$, and
    wherein
    p: measurement point,
    $\theta_i$: incident angle (zenith angle component),
    $\phi_i$: incident angle (azimuth angle component),
    $\theta_r$: reflection angle (zenith angle component),
    $\phi_r$: reflection angle (azimuth angle component),
    $\theta_{is}$: regular reflection incident angle with respect to $\theta_r$ (zenith angle component),
    $\phi_{is}$: regular reflection incident angle with respect to $\phi_r$ (azimuth angle component),
    f: reflectance property, and
    $\Omega$: point symmetric region having $(\theta_{is}, \phi_{is})$ as center.

3. The profilometer according to claim 2, wherein a light source distribution in which the light source distribution $L_i(p, \theta, \phi)$ is approximated so as not to depend on a position p and a normal vector on the p and so as to be constant with respect to the p and the normal vector on the p is used.

4. The profilometer according to claim 3, wherein, considering a sphere which center is the measuring target and both poles are in a plane including comprising the measuring target, the light source distribution linearly changes with respect to a longitude of the sphere.

5. The profilometer according to claim 3, wherein, considering a sphere which center is the measuring target and both poles are in a plane including comprising the measuring target, the light source distribution linearly changes with respect to a latitude of the sphere.

6. The profilometer according to claim 3, wherein the light emission region has a planar shape and the light source distribution linearly changes on the plane.

7. The profilometer according to claim 1, wherein the light source distribution of the lighting device includes comprises a plurality of light source distributions superimposed on each other, each of the plurality of light source distributions being the light source distribution according to any one of claim 1 and differing from each other.

8. A measuring apparatus for measuring a surface of a measuring target arranged at a predetermined measurement point, the measuring apparatus comprising:
    a lighting device that irradiates the surface of the measuring target with light comprising a first light source distribution and light comprising a second light source distribution;
    an imaging section that images the surface of the measuring target irradiated with the light by the lighting device; and
    a measurement processing section that obtains information on a light reflection angle at the measurement point on the surface of the measuring target using an image imaged by the imaging section,
    wherein the lighting device has a light emission region having a predetermined extent, and
    wherein, when radiances in the first light source distribution and the second light source distribution in a direction toward the measurement point from a point that has an angle $\theta$ on the light emission region when viewed from the measurement point are expressed as $L_{11}(\theta)$ and $L_{12}(\theta)$ on a first plane passing through the measurement point, the first light source distribution and the second light source distribution are set with respect to a plurality of points i on the light emission region such that:
    (1) at least one of the radiances $L_{11}(\theta)$ and $L_{12}(\theta)$ increases or decreases in a continuous or stepwise manner according to the angle $\theta$;
    (2) in a local region of a predetermined range of $\pm\sigma$ comprising an angle $\theta_i$ with the point i as the center, the radiances $L_{11}(\theta)$ and $L_{12}(\theta)$ are not zero, and $L_{11}(\theta_i-a)+L_{11}(\theta_i+a)=2\times L_{11}(\theta_i)$, and $L_{12}(\theta_i-a)+L_{12}(\theta_i+a)=2\times L_{12}(\theta_i)$ substantially hold for arbitrary a satisfying $0<a\leq\sigma$; and
    (3) a ratio $L_{11}(\theta_i)/L_{12}(\theta_i)$ of the radiances at the point i varies in each of the angles $\theta_i$.

9. The measuring apparatus according to claim 8, wherein each of the radiances $L_{11}(\theta)$ and $L_{12}(\theta)$ is a linear function of the angle $\theta$.

10. The measuring apparatus according to claim 8, wherein wherein the lighting device further irradiates the surface of the measuring target with light having a third light source distribution,
    wherein, when radiances in the first light source distribution and the third light source distribution in a direction toward the measurement point from a point that has an angle $\phi$ on the light emission region when viewed from the measurement point are expressed as $L_{21}(\phi)$ and $L_{23}(\phi)$ on a second plane passing through the measurement point, the second plane being different from the first plane, the first light source distribution and the third light source distribution are set with respect to a plurality of points j on the light emission region such that:
(1) at least one of the radiances $L_{21}(\phi)$ and $L_{23}(\phi)$ increases or decreases in a continuous or stepwise manner according to the angle $\phi$;
(2) in a local region of a predetermined range of $\pm\sigma$ comprising an angle $\phi_j$ with the point j as the center, the radiances $L_{21}(\sigma)$ and $L_{23}(\sigma)$ are not zero, and $L_{21}(\phi_j-a)+L_{21}(\phi_j+a)=2\times L_{21}(\phi_j)$, and $L_{23}(\phi_j-a)+L_{23}(\phi_j+a)=2\times L_{23}(\phi_j)$ substantially hold for arbitrary a satisfying $0<a\leq\sigma$; and
(3) a ratio $L_{21}(\phi_j)/L_{23}(\phi_j)$ of the radiances at the point j varies in each of the angles $\phi_j$.

11. The measuring apparatus according to claim 10, wherein each of the radiances $L_{21}(\phi)$ and $L_{23}(\phi)$ is a linear function of the angle $\phi$.

12. The measuring apparatus according to claim 8, wherein the lighting device simultaneously irradiates the surface of the measuring target with the light comprising the first light source distribution and the light comprising the second light source distribution, the light comprising the first light source distribution differing from the light comprising the second light source distribution in a wavelength, and
wherein the imaging section separates received reflected light into pieces of light comprising the wavelengths and detects an intensity of each of the pieces of reflected light of the light comprising the first light source distribution and the light comprising the second light source distribution.

13. The measuring apparatus according to claim 10, wherein the lighting device simultaneously irradiates the surface of the measuring target with the light comprising the first light source distribution, the light comprising the second light source distribution, and the light comprising the third light source distribution, the light comprising the first light source distribution, the light comprising the second light source distribution, and the light comprising the third light source distribution differing from one another in a wavelength, and
wherein the imaging section separates received reflected light into pieces of light comprising the wavelengths and detects an intensity of each of the pieces of reflected light of the light comprising the first light source distribution, the light comprising the second light source distribution, and the light comprising the third light source distribution.

14. The measuring apparatus according to claim 8, wherein the measurement processing section obtains a feature value from the image obtained by the imaging section, the feature value expressing a ratio of intensity of reflected light of the light comprising the first light source distribution and an intensity of reflected light of the light comprising the second light source distribution, and
wherein the measurement processing section obtains the information on the light reflection angle in the first plane of the surface of the measuring target based on the feature value.

15. The measuring apparatus according to claim 10, wherein the measurement processing section obtains a feature value from the image obtained by the imaging section, the feature value expressing a ratio of intensity of reflected light of the light comprising the first light source distribution and intensity of reflected light of the light comprising the third light source distribution, and
wherein the measurement processing section obtains the information on the light reflection angle in the second plane of the surface of the measuring target based on the feature value.

16. An observing apparatus for observing reflected light from a surface of a measuring target arranged at a predetermined measurement point, the observing apparatus comprising:
a lighting device that irradiates the surface of the measuring target with light comprising a first light source distribution; and
an imaging section that images the surface of the measuring target irradiated with the light by the lighting device,
wherein the lighting device comprises a light emission region comprising a predetermined extent, and
wherein, when a radiance in the first light source distribution in a direction toward the measurement point from a point that has an angle $\theta$ on the light emission region when viewed from the measurement point is expressed as $L_{11}(\theta)$ on a first plane passing through the measurement point, the first light source distribution is set such that:
(1) the radiance $L_{11}(\theta)$ changes in a continuous or stepwise manner according to the angle $\theta$; and
(2) in a local region of a predetermined range of $\pm\sigma$ centering on a point that is located at a predetermined angle $\theta_C$ when viewed from the measurement point on the first plane, the radiance $L_{11}(\theta)$ is not zero, and $L_{11}\theta_C-a)+L_{11}\theta_C+a)=2\times L_{11}\theta_C)$ substantially holds for arbitrary a satisfying $0<a\leq\sigma$.

17. The observing apparatus according to claim 16, wherein the lighting device further irradiates the surface of the measuring target with light comprising a second light source distribution, the second light source distribution being different from the first light source distribution, and
wherein, when a radiance in the second light source distribution in a direction toward the measurement point from a point that has an angle $\theta$ on the light emission region when viewed from the measurement point is expressed as $L_{12}(\theta)$ on the first plane, the second light source distribution is set such that the radiance $L_{12}(\theta)$ is not zero in the local region and $L_{12}\theta_C-a)+L_{12}\theta_C+a)=2\times L_{12}\theta_C)$ substantially holds for arbitrary a satisfying $0<a\leq\sigma$.

18. The observing apparatus according to claim 17, wherein the lighting device simultaneously irradiates the surface of the measuring target with the light comprising the first light source distribution and the light having the second light source distribution, the light comprising the first light source distribution differing from the light comprising the second light source distribution in a wavelength, and
wherein the imaging section separates received reflected light into pieces of light comprising the wavelengths and detects an intensity of each of the pieces of reflected light of the light comprising the first light source distribution and the light comprising the second light source distribution.

19. A method for observing reflected light from a surface of a measuring target arranged at a predetermined measurement point, the method comprising the steps of:
irradiating the surface of the measuring target with light comprising a first light source distribution from a lighting device; and imaging the surface of the measuring target irradiated with the light with an imaging section, wherein the lighting device comprises a light emission region comprising a predetermined extent, and wherein, when a radiance in the first light source distribution in a direction toward the measurement point from a point that comprises an angle $\theta$ on the light emission region when viewed from the measurement point is expressed as $L_{11}(\theta)$ on a first plane passing through the measurement point, the first light source distribution is set such that:

(1) the radiance $L_{11}(\theta)$ changes in a continuous or stepwise manner according to the angle $\theta$, and (2) in a local region of a predetermined range of $\pm\sigma$ centering on a point that is located at a predetermined angle $\theta_C$ when viewed from the measurement point on the first plane, the radiance $L_{11}(\theta)$ is not zero, and $L_{11}(\theta_C - a) + L_{11}(\theta C + a) = 2 \times L_{11}(\theta_C)$ substantially holds for arbitrary a satisfying $0 < a \leq \sigma$.

* * * * *